US012784934B2

(12) United States Patent
Wheeler et al.

(10) Patent No.: US 12,784,934 B2
(45) Date of Patent: Nov. 3, 2026

(54) CORE-SHELL NANOWIRE ELECTRODES AND METHODS OF MAKING THE SAME

(71) Applicants: Alliance for Energy Innovation, LLC, Golden, CO (US); Colorado School of Mines, Golden, CO (US)

(72) Inventors: Lance Michael Wheeler, Golden, CO (US); Steven John Digregorio, Albuquerque, NM (US); Owen James Hildreth, Lakewood, CO (US); Collin Everett Miller, Golden, CO (US)

(73) Assignee: Alliance for Energy Innovation, LLC, Golden, CO (US)

( * ) Notice: Subject to any disclaimer, the term of this patent is extended or adjusted under 35 U.S.C. 154(b) by 176 days.

(21) Appl. No.: 18/524,589

(22) Filed: Nov. 30, 2023

(65) Prior Publication Data

US 2024/0177886 A1 May 30, 2024

Related U.S. Application Data

(60) Provisional application No. 63/429,029, filed on Nov. 30, 2022.

(51) Int. Cl.
*C23C 18/16* (2006.01)
*B22F 1/054* (2022.01)
(Continued)

(52) U.S. Cl.
CPC ............. *H01B 5/16* (2013.01); *B22F 1/0547* (2022.01); *B22F 1/142* (2022.01); *B22F 1/145* (2022.01);
(Continued)

(58) Field of Classification Search
CPC .......... H01B 5/16; B22F 1/054; B22F 1/0547; B22F 1/142; B22F 1/145; B22F 1/17;
(Continued)

(56) References Cited

U.S. PATENT DOCUMENTS

| | | | | |
|---|---|---|---|---|
| 3,952,053 A | | 4/1976 | Brown, Jr. et al. | |
| 8,748,749 B2 | * | 6/2014 | Srinivas | H05K 1/0298 428/323 |

(Continued)

FOREIGN PATENT DOCUMENTS

| | | | | |
|---|---|---|---|---|
| CN | 109686497 A | * | 4/2019 | B22F 9/22 |
| KR | 20090126825 A | * | 12/2009 | C23C 18/165 |

(Continued)

OTHER PUBLICATIONS

Kim et al., Junction-free Flat Copper Nanofiber Network-based Transparent Heater with High Transparency, High Conductivity, and High Temperature, Scientific Reports (2018) 8:13581. (Year: 2018).*

(Continued)

*Primary Examiner* — William P Fletcher, III
(74) *Attorney, Agent, or Firm* — Michael A. McIntyre

(57) ABSTRACT

An aspect of the present disclosure is a method that includes depositing an ink as a liquid strand onto a substrate, transforming the liquid strand to a precursor strand, converting at least a portion of the precursor strand to a nanowire that includes a first metal, and coating the nanowire with a second metal to form a core-shell nanowire having a core and a shell, where at least a portion of the transforming occurs during the depositing, and the core includes the nanowire and the shell includes the second metal.

20 Claims, 18 Drawing Sheets

(51) Int. Cl.
*B22F 1/142* (2022.01)
*B22F 1/145* (2022.01)
*B22F 1/17* (2022.01)
*C23C 18/40* (2006.01)
*H01B 5/16* (2006.01)

(52) U.S. Cl.
CPC .............. *B22F 1/17* (2022.01); *C23C 18/165* (2013.01); *C23C 18/405* (2013.01); *B22F 2301/10* (2013.01); *B22F 2301/255* (2013.01); *B22F 2998/10* (2013.01)

(58) Field of Classification Search
CPC ............ B22F 2301/10; B22F 2301/255; B22F 2998/10; B22F 2007/042; B22F 2999/00; C23C 18/165; C23C 18/405; D04H 1/728; D01D 5/0007
See application file for complete search history.

(56) References Cited

U.S. PATENT DOCUMENTS

| | | | | |
|---|---|---|---|---|
| 2008/0213853 A1* | 9/2008 | Garcia | C12N 13/00 422/291 |
| 2011/0177332 A1* | 7/2011 | Park | B29C 48/08 977/762 |

FOREIGN PATENT DOCUMENTS

| | | | | |
|---|---|---|---|---|
| KR | 20180053490 A * | 5/2018 | C23C 18/31 |
| WO | WO-2014073771 A1 * | 5/2014 | B82B 3/00 |
| WO | 2016122004 A1 | 8/2016 | |

OTHER PUBLICATIONS

An, S. et al., "Self-Junctioned Copper Nanofiber Transparent Flexible Conducting Film via Electrospinning and Electroplating," Materials Views, vol. 28, 2016, 6 pages.
Azani, M-R. et al., "Benefits, Problems, and Solutions of Silver Nanowire Transparent Conductive Electrodes in Indium Tin Oxide (ITO)-Free Flexible Solar Cells," Advanced Energy Materials, vol. 10, 2020, 32 pages.
Bao, C. et al., "In Situ Fabrication of Highly Conductive Metal Nanowire Networks with High Transmittance from Deep-Ultraviolet to Near-Infrared," ACS Nano, vol. 9, No. 3, 2015, 8 pages.
Chen, X. et al., "Printable High-Aspect Ratio and High-Resolution Cu Grid Flexible Transparent Conductive Film with Figure of Merit over 80 000," Advanced Electronic Materials, vol. 5, 2019, 8 pages.
Cheng, D. et al., "Core-shell-structured bimetallic clusters and nanowires," Journal of Physics: Condensed Matter, vol. 19, 2007, 12 pages.
Hsu, P-C. et al., "Electrolessly Deposited Electrospun Metal Nanowire Transparent Electrodes," Journal of the American Chemical Society, vol. 136, 2014, 4 pages.
Huang, S. et al., "Metal nanowires for transparent conductive electrodes in flexible chromatic devices: a review," Environmental Chemistry Letters, vol. 20, 2022, 33 pages.
Jang, J. et al., "Rapid production of large-area, transparent and stretchable electrodes using metal nanofibers as wirelessly operated wearable heaters," NPG Asia Materials, vol. 9, 2017, 10 pages.
Jiang, D-H. et al., "Facile Preparation of Cu/Ag Core/Shell Electrospun Nanofibers as Highly Stable and Flexible Transparent Conductive Electrodes for Optoelectronic Devices," ACS Applied Materials & Interfaces, vol. 11, 2019, 10 pages.
Khan, A. et al., "High-performance Flexible Transparent Electrode with an Embedded Metal Mesh Fabricated by Cost-Effective Solution Process," Materials Views, vol. 12, No. 22, 2016, 10 pages.
Kim, D-H. et al., "Transparent and flexible film for shielding electromagnetic interference," Materials and Design, vol. 89, 2016, 5 pages.
Kim, G-H. et al., "Junction-free Flat Copper Nanofiber Network-based Transparent Heater with High Transparency, High Conductivity, and High Temperature," vol. 8:13581, 2018, 8 pages.
Kiremitler, N.B. et al., "Rapid fabrication of high performance transparent electrodes by electrospinning of reactive silver ink containing nanofibers," Journal of Industrial and Engineering Chemistry, vol. 93, 2021, 11 pages.
Kowon, Y-T et al., "Electrospun CuS/PVP Nanowires and Superior Near Infrared Filtration Efficiency for Thermal Shielding Applications," ACS Applied Materials & Interfaces, vol. 11, 2019, 6 pages.
Krasnow, B., "Make plastic printed circuits with a standard laser cutter," https://benkrasnow.blogspot.com/2018/09/make-plastic-printed-circuits-with.html, Sep. 3, 2018, 1 page.
Kumar, A. et al., "Silver Nanowire Synthesis and Strategies for Fabricating Transparent Conducting Electrodes," Nanomaterials, vol. 11, 2021, 50 pages.
Lai, Z. et al., "Directly Electroplated Metallization on Flexible Substrates Based on Silver Nanowire Conductive Composite for Wearable Electronics," ACS Applied Nano Materials, vol. 4, 2021, 10 pages.
Lee, S. et al., "Electrodeposited Silver Nanowire Transparent Conducting Electrodes for Thin-Film Solar Cells," ACS Applied Materials & Interfaces, vol. 12, 2020, 7 pages.
Li, X. et al., "In Situ Engineering of the Core-Shell Ag@Cu Structure on Porous Nanowire Arrays for High Energy and Stable Aqueous Ag—Bi Batteries," ACS Applied Materials & Interfaces, vol. 12, 2020, 9 pages.
Nguyen, V-H et al., "Advances in Flexible Metallic Transparent Electrodes," Small, vol. 18, 2022, 47 pages.
Prestowitz, L. et al., "Bulk Nanostructured Metal from Multiply-Twinned Nanowires," Nano Letters, vol. 21, 2021, 6 pages.
Shen, S. et al., "High-performance composite Ag—Ni mesh based flexible transparent conductive film as multifunctional devices," Optics Express, vol. 26, No. 21, Oct. 15, 2018, 10 pages.
Song, J. et al., "Fabrication of junction-free Cu nanowire networks via Ru-catalyzed electroless deposition and their application to transparent conducting electrodes," Nanotechnology, vol. 33, 2022, 11 pages.
Song, R. et al., "An ultra-long and low junction-resistance Ag transparent electrode by electrospun nanofibers," RSC Advances, vol. 6, 2016, 8 pages.
Stewart, I.E. et al., "Synthesis of Cu—Ag, Cu—Au, and Cu—Pt Core-Shell Nanowires and Their Use in Transparent Conducting Films," Chemistry of Materials, vol. 27, 2015, 7 pages.
Teo, W.E. et al., "A review on electrospinning design and naofibre assemblies," Nanotechnology, vol. 17, 2006, 18 pages.
Testa, A. et al., "Transparent Flexible Electrodes Based on Junctionless Copper Nanowire Network via Selective Electrodes Metallization of Electrospun Nanofibers," Journal of the Electrochemical Society, vol. 164, No. 12, 2017, 7 pages.
Walker et al., "Reactive Silver Inks for Patterning High-Conductivity Features at Mild Temperatures," Journal of the American Chemical Society, vol. 134, 2012, 3 pages.
Wang, Q. et al., "The mixture of silver nanowires and nanosilver-coated copper micronflakes for electrically conductive adhesives to achieve high electrical conductivity with low percolation threshold," Journal of Alloys and Compounds, vol. 820, 2020, 11 pages.
Wang, Y. et al., "Electrospun nanofiber-based soft electronics," NPG Asia Materials, vol. 13, No. 22, 2021, 22 pages.
Woo, H. et al., "Highly flexible and transparent film heater with electrospun copper conductive network via junction-free structure," Journal of Alloys and Compounds, vol. 886, 2021, 9 pages.
Wu, H. et al., "A transparent electrode based on a metal nanotrough network," Nature Nanotechnology, vol. 8, Jun. 2013, 5 pages.
Yang, Y. et al., "Advances in constructing silver nanowire-based conductive pathways for flexible and stretchable electronics," Nanoscale, vol. 14, 2022, 28 pages.
Yu, S. et al., "Enhanced adhesion of Ag nanowire based transparent conducting electrodes for application in flexible electrochromic devices," Optical Materials, vol. 120, 2021, 7 pages.

(56) References Cited

OTHER PUBLICATIONS

Zhao, J. et al., "Preparation and characterization of copper/silver bimetallic nanowires with core-shell structure," Surface and Interface Analysis, vol. 47, 2015, 6 pages.
Zheng, Z. et al., "Electrospun nanowire arrays fo electronics and optoelectronics," Science China Materials, vol. 99, No. 3, Mar. 2016, 17 pages.

* cited by examiner

CORE-SHELL NANOWIRE ELECTRODES AND METHODS OF MAKING THE SAME

CROSS-REFERENCE TO RELATED APPLICATIONS

This application claims priority from U.S. Provisional Patent Application No. 63/429,029 filed on Nov. 30, 2023, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Transparent conducting electrodes (TCEs) are essential components in devices such as touch screens, smart windows, and photovoltaics. Metal nanowire networks are promising next-generation TCEs, but best-performing examples rely on expensive metal catalysts (palladium or platinum), vacuum processing, or transfer processes that cannot be easily scaled to manufacturing processes. Thus, there remains a need for scalable manufacturing methods for producing high performance metal nanowire networks.

SUMMARY

An aspect of the present disclosure is a method that includes depositing an ink as a liquid strand onto a substrate, transforming the liquid strand to a precursor strand, converting at least a portion of the precursor strand to a nanowire that includes a first metal, and coating the nanowire with a second metal to form a core-shell nanowire having a core and a shell, where at least a portion of the transforming occurs during the depositing, and the core includes the nanowire and the shell includes the second metal. In some embodiments of the present disclosure, the first metal and the second metal may be the same. In some embodiments of the present disclosure, the first metal may be different than the second metal.

In some embodiments of the present disclosure, the substrate may include at least one of a metal oxide, a transparent conducting oxide (TCO), a glass, and/or a plastic. In some embodiments of the present disclosure, the first metal may include at least one of silver, copper, gold, aluminum, nickel, platinum, palladium, zinc, and/or iron. In some embodiments of the present disclosure, the second metal may include at least one of copper, silver, gold, aluminum, nickel, platinum, palladium, zinc, and/or iron.

In some embodiments of the present disclosure, the ink may include a metal precursor and a polymer. In some embodiments of the present disclosure, the ink may be prepared by preparing a metal ink that includes the metal precursor, preparing a solution that includes the polymer, and combining the metal ink and the solution to form the ink. In some embodiments of the present disclosure, the depositing may be performed using electrospinning.

In some embodiments of the present disclosure, the converting may result in at least a portion of the first metal transferring to a surface of the precursor strand. In some embodiments of the present disclosure, the converting may include exposing a surface of the precursor strand to at least one of ultraviolet light, ozone, and/or plasma. In some embodiments of the present disclosure, the converting may include ultraviolet light and ozone. In some embodiments of the present disclosure, the converting may include exposing a surface of the precursor strand to at least one of a liquid and/or a gas. In some embodiments of the present disclosure, the precursor strand may be exposed to hydrogen gas and the hydrogen gas may reduce the polymer and/or the silver salt. In some embodiments of the present disclosure, the precursor strand may be exposed to an acid and the acid may at least one of depolymerizes or decomposes the polymer.

In some embodiments of the present disclosure, the converting may further include heating at least one of the precursor strand or the nanowire. In some embodiments of the present disclosure, the coating may include electroless plating of the second metal onto the nanowire.

An aspect of the present disclosure is a device that includes a network of physically interconnected core-shell nanowires deposited on a substrate, where each nanowire includes a core having a first metal and a shell having a second metal positioned around the core, each core-shell nanowire has a diameter, Dnw, between 1 nm and 1 μm, and the substrate includes at least one of a metal oxide, a transparent conducting oxide (TCO), a glass, or a plastic. In some embodiments of the present disclosure, the network may have a nanowire areal coverage on the substrate between 0.1% and 50%. In some embodiments of the present disclosure, the device may be characterized by a Haacke Figure of Merit between $1\times10^{-3}\cdot\Omega^{-1}$ and $700\times10^{-3}\cdot\Omega^{-1}$.

BRIEF DESCRIPTION OF DRAWINGS

Some embodiments are illustrated in referenced figures of the drawings. It is intended that the embodiments and figures disclosed herein are to be considered illustrative rather than limiting.

To facilitate understanding, identical reference numerals have been used, where possible, to designate identical elements that are common to the figures. It is contemplated that elements and features of one embodiment may be beneficially incorporated in other embodiments without further recitation.

Figure 1:
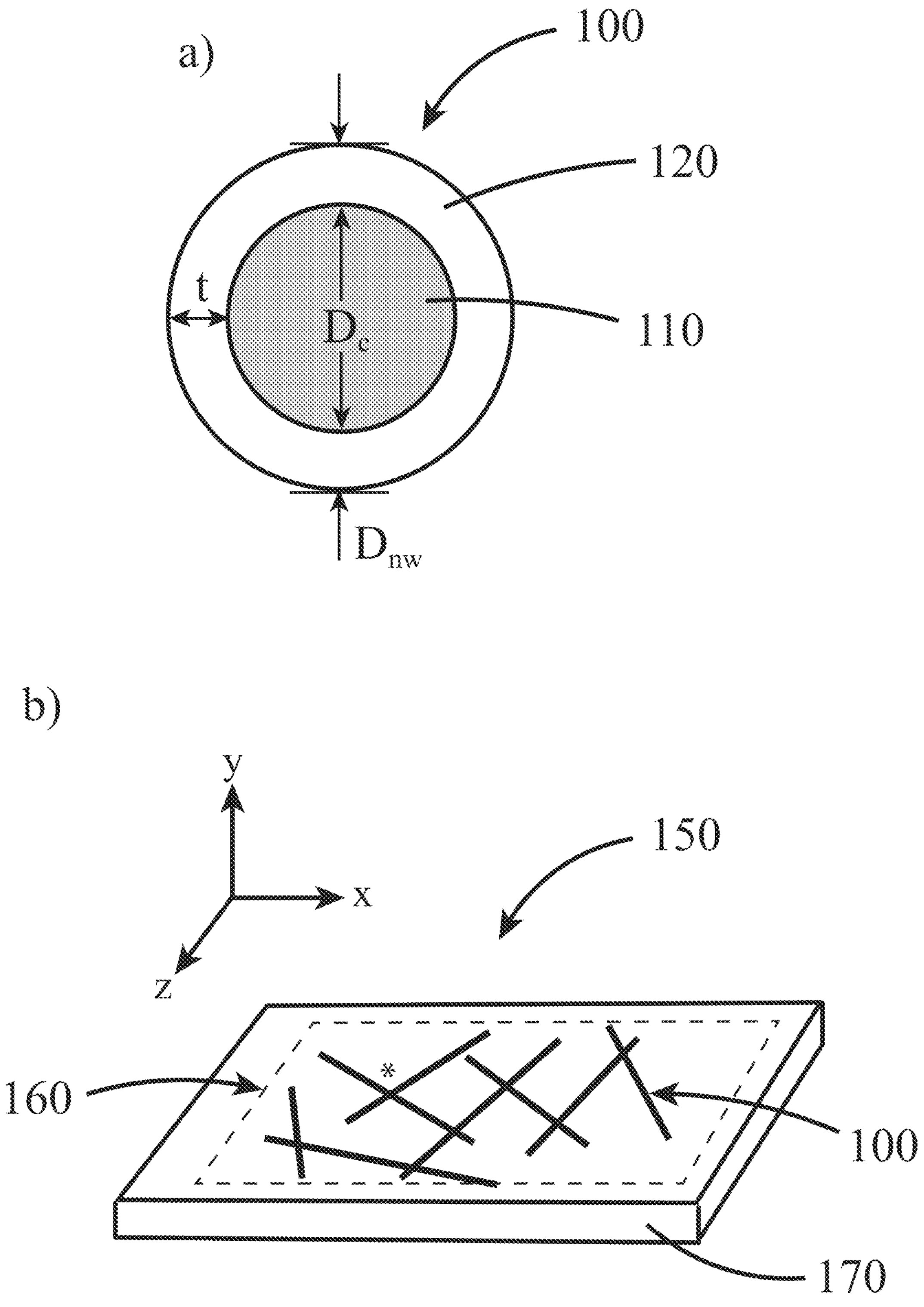
FIG. 1 illustrates (Panel a) a cross-sectional view of a core-shell nanowire and (Panel b) a device that network of core-shell nanowires deposited on a substrate, according to some embodiments of the present disclosure.

| REFERENCE NUMERALS | |
|---|---|
| 100 | core-shell nanowire |
| 110 | core |
| 120 | shell |
| 150 | device |
| 160 | network |
| 170 | substrate |
| 200 | method |
| 210 | ink preparation |
| 215 | ink |
| 220 | depositing |
| 225 | precursor strand |
| 230 | converting |
| 235/245 | nanowire |
| 240 | heating |
| 250 | coating |
| 300 | metal ink preparation |
| 305 | metal ink |
| 310 | polymer solution preparation |
| 315 | polymer solution |
| 320 | combining |

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to transparent conducting electrodes (TCEs) constructed of networks of interconnected metal core-shell nanowires and methods for manufacturing such TCEs, that are, among other things, scalable to manufacturing scale. As described herein, in some embodiments of the present disclosure, direct metallization and plating metallization processes are performed on electrospun nanowires, resulting in the synthesis of core-shell nanowires and networks of core-shell nanowires. For example, silver nanowires were produced by electrospinning a reactive silver-containing ink onto a substrate, resulting in the forming of silver-containing precursor strand on the substrate, which was subsequently converted to a silver nanowire. As described herein, the conversion of a precursor strand to a solid nanowire, e.g., a silver nanowire, may be achieved by exposing the precursor strand to at least one of thermal irradiation, ultraviolet (UV) light, ozone, and/or plasma. Subsequently, for the example of a silver nanowire, the silver catalyzed copper plating onto the surface of the silver nanowire, resulting in Ag—Cu core-shell nanowires. As shown herein, the resultant Ag—Cu core-shell nanowires eliminated or greatly reduced nanowire junction resistances in networks constructed of a plurality interconnecting Ag—Cu core-shell nanowires. Among other things, this method of manufacture allows for tunable transmission and sheet resistance properties by adjusting electrospinning conditions and/or plating (i.e., coating) conditions. As shown herein, excellent performing core-shell nanowire networks were successfully fabricated to produce state-of-the-art TCEs using an all-atmospheric process with sheet resistances of 0.33 Ω·sq−1 and visible light transmittances of 86% (including the substrate), leading to a Haacke figure of merit of 652×10−3·Ω−1.

Panel a of FIG. 1 illustrates a cross-sectional view of a core-shell nanowire 100, according to some embodiments of the present disclosure. A core-shell nanowire 100 includes a nanowire positioned within an outer layer or shell 120. Thus, the nanowire provides the material that makes up the core 110 of the core-shell nanowire 100. A core 110 may have a substantially circular cross-sectional shape, as illustrated in Panel a of FIG. 1, or any other cross-sectional shape like hemispherical, elliptical, and polygons depending on the electrospinning conditions and/or equipment used to produce the precursor strand (not shown) that is subsequently converted to the nanowire/core 110. For the example of a core 110 having a circular cross-sectional shape, the core may be characterized by a diameter, De. For cores 110 having other cross-sectional shapes, a core 110 may be characterized by some other length as is suitable for the shape. For example, triangular-shaped core 110 may be characterized by the length of the base of the triangle and/or the length of the height of the triangle. Further, in some embodiments of the present disclosure, a core 110 may have an irregular cross-sectional shape that may be characterized by an average width of the core 110, a maximum width of the core 110, and/or a minimum width of the core 110. So, in general, the length measurement used to characterize the width of a core 110 is referred to herein as a characteristic width. For the specific case of a core 100 having circular cross section, the characteristic width is equal to the diameter, $D_c$. In some embodiments of the present disclosure, the core 110 of a core-shell nanowire 100 may have an average diameter, $D_c$, and/or a characteristic length between 1 nm and 1 μm, or between 10 nm and 500 nm, or between 20 nm and 250 nm.

Referring again to Panel a of FIG. 1, a shell 120 may be deposited onto a nanowire/core 110 in the form of a uniform, conformal coating that covers all or substantially all of the outer surfaces of core 110, resulting in the formation of the core-shell nanowire 100. As shown in Panel a of FIG. 1 for the example of a starting nanowire (i.e., core 110) having a substantially circular cross-sectional shape, a shell 120 may conform to the same basic shape as the core 110, resulting in a core-shell nanowire 100 that also has a substantially circular cross-sectional shape. Similarly, core-shell nanowires 100 stemming from starting nanowires having non-circular shapes will also have cross-sectional shapes that are substantially non-circular and match the shapes of the starting nanowire (i.e., core 110). For example, a core-shell nanowire 100 based on coating a nanowire having a triangular cross-sectional shape may also have a substantially triangularly shaped cross-section, or as the thickness of shell increases, the cross-sectional shape of the resultant core-shell nanowire 100 may approach a circular cross-section.

In some embodiments of the present disclosure, a core-shell nanowire 100 may include a core 110 constructed using a first metal and a shell 120 constructed using a second metal. In some embodiments of the present disclosure, the first metal may be identical to the second metal, or the first metal and second metal may be different. In some embodiments of the present disclosure, the first metal may include at least one of silver, copper, gold, aluminum, nickel, platinum, palladium, zinc, and/or iron. In some embodiments of the present disclosure, the second metal may include at least one of silver, copper, gold, aluminum, nickel, platinum, palladium, zinc, and/or iron. A first metal may be constructed of a single essentially pure metal or a first metal may be constructed of a mixture of several metals. Similarly, a second metal may be constructed of a single essentially pure metal or a first metal may be constructed of a mixture of several metals.

Referring to Panel b of FIG. 1, a plurality of core-shell nanowires 100 may be deposited onto a substrate 170 to create a device 150, e.g., a transparent conducting electrode (TCE). A plurality of core-shell nanowires 100 may form a network 160 of overlapping and/or interconnected core-shell nanowires 100, with the physical contact of neighboring core-shell nanowires forming junctions. A single junction is indicated in Panel b of FIG. 1 by an asterisk (*). In some embodiments of the present disclosure, a substrate 170 may be constructed of at least one of a metal oxide, a transparent conducting oxide (TCO), a glass, and/or a plastic.

Examples of TCOs suitable for use as a substrate 170 include indium tin oxide (ITO), zinc oxide (ZnO), tin oxide, aluminum doped zinc oxide (AZO), indium oxide, cadmium oxide, indium doped zinc oxide, and combinations thereof. Examples of the metal oxides suitable for use as a substrate 170 include tin oxide, nickel oxide, alumina, titania, silicon oxide, and combinations thereof. Examples of plastics suitable for use as a substrate 170 include polyolefins, polyamines, polyamides, polyethylene terephthalate, and combinations thereof. In some embodiments of the present disclosure, a substrate 170 may have a thickness between 1 μm and 25 mm or between 30 μm and 10 mm. Referring again to Panel b of FIG. 1, the device 150 and the substrate 170 are shown as flat, planar objects, having a uniform thickness. This is shown for exemplary purposes. In some embodiments of the present disclosure, a device may utilize a curved substrate and/or a substrate having a variable thickness, for example for an optical lens.

Referring again to Panel b of FIG. 1, once formed on a substrate 170, core-shell nanowires 100 making up a network 160 may be positioned substantially within an xz-plane that is substantially parallel to the substrate 170. By adjusting the electrospinning conditions, a plurality of core-shell nanowires 100 may be formed on a substrate 170 in any pattern desired. The exemplary network 160 illustrated in Panel b of FIG. 1, includes a plurality of relatively straight core-shell nanowires 100, randomly distributed across the surface of the substrate 170. Further, in this example, the core-shell nanowires 100 making up the network 160 have relatively short lengths, with each individual core-shell nanowire 100 having clearly distinguishable ends. However, this is but one possible example, and is shown for illustrative purposes. Thus, both random and/or non-random patterns of core-shell nanowires may be deposited onto a substrate 170. For example, core-shell nanowires 100 may be deposited to form a network 160 having a non-random, grid-like pattern of core-shell nanowires 100. In some embodiments of the present disclosure, core-shell nanowires 100 may be deposited to form a network 160 of long, intertwined core-shell nanowires 100, that are randomly distributed on the surface of a substrate 170. The density of core-shell nanowires 100 on a substrate 170 can be represented by an areal coverage. In some embodiments of the present disclosure, the areal coverage of core-shell nanowires 100 on a substrate 170 may be between 0.1% and 50%. In some embodiments of the present disclosure, a network may be constructed of a single core-shell nanowire that crosses itself many times, thereby forming multiple junctions. In some embodiments of the present disclosure, a network may be constructed of two or more core-shell nanowires that cross each other many times, thereby forming multiple junctions.

As described herein, transparent conducting electrodes (TECs) were successfully manufactured, constructed of networks 160 of core-shell nanowires 100 deposited onto substrates 170. These devices exhibited excellent performance metrics. In some embodiments of the present disclosure, a device 150 manufactured according to the methods described herein may be characterized by a Haacke Figure of Merit between $1\times10^{-3}\cdot\Omega^{-1}$ and $700\times10^{-3}\cdot\Omega^{-1}$. In some embodiments of the present disclosure, a device 150 may be characterized by a transmittance of visible light through the network 160 and the substrate 170 between 0% and 95%. In some embodiments of the present disclosure, a device 150 may be characterized by a sheet resistance between 0.1 Ω/sq and 500 Ω/sq. In some embodiments of the present disclosure, a device 150 may be characterized by an optical haze between 1% and 15%. Optical haze is the percentage of transmitted light that is scattered by more than 2.5° as it passes through the TCE.

Figure 2:
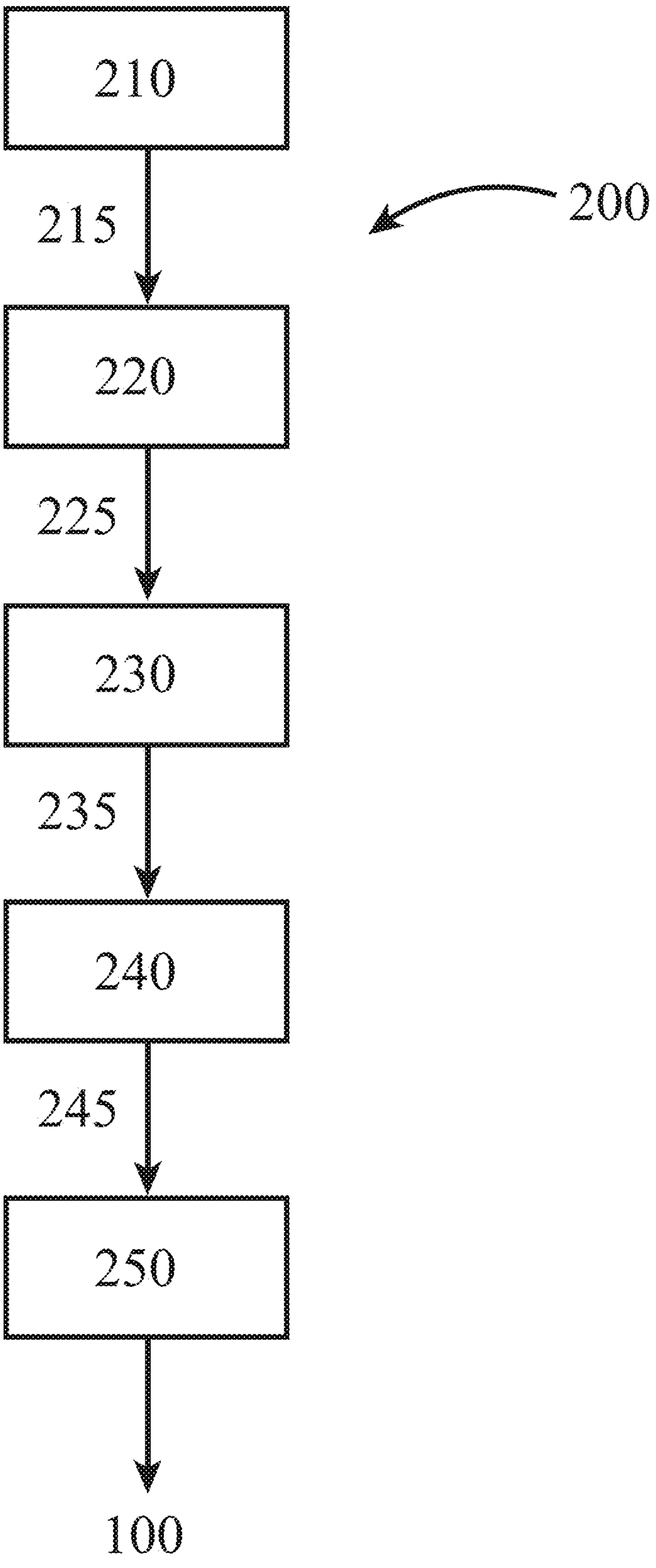
FIG. 2 illustrates a method for manufacturing a device like that illustrated in FIG. 1, according to some embodiments of the present disclosure.

FIG. 2 illustrates a method 200 for manufacturing core-shell nanowires 100 and/or devices 150 that utilize networks 160 of core-shell nanowires 100, like those illustrated in FIG. 1. In brief, this exemplary method 200 includes an ink preparation step 210 (see FIG. 3) that results in an ink 215 that includes, among other things, a first metal and/or a precursor of the first metal used to synthesize the nanowire/core 110 of a core-shell nanowire 100. The ink 215 is deposited by electrospinning the ink onto a substrate 170, resulting in a precursor strand 225. The ink 215 may be supplied as a liquid solution, a liquid-liquid dispersion, and/or a liquid-solid dispersion, such that upon depositing 220 the ink 215 onto a substrate 170, the liquid portions of the ink 215 are evaporated, resulting in the forming of a precursor strand 225 that is substantially liquid free, i.e., a solid. Thus, an ink 215 may present during depositing 220 as a liquid strand of ink for a brief period of time, that quickly solidifies into a precursor strand 225 that is in a solid form.

The ink preparation 210 is described in more detail below (see FIG. 3). However, in brief, an ink 215 may include both the metal and/or metal precursors needed to synthesize the core 110 (i.e., nanowire 235/245) of a targeted core-shell nanowire 100, in addition to one or more polymers. Thus, a precursor strand 225 is itself not the core 110 constructed of a first metal, nor would a precursor strand 225 be effective at catalyzing the plating of a second metal onto the first metal to form a targeted core-shell nanowire 100. Therefore, a precursor strand 225 is converted to the nanowire 235 that eventually becomes the core 110 of the core-shell nanowire 100. Such a converting 230 step, among other things, results in the first metal migrating to the surface of newly formed nanowire 235 and/or the deconstruction/decomposition of the polymer(s) originally present in the ink 210. As described below, the converting 230 of a precursor strand 225 to a nanowire 235/245 may be achieved in one or more steps, where a second step may include heating 240 an intermediate nanowire 235 to produce a second nanowire 245. The second nanowire 235 may be subsequently directed to a coating 250 step, where a shell 120 is deposited onto the nanowire 245 (i.e., core 110), resulting in the synthesis of a core-shell nanowire 100.

Referring again to FIG. 2, in some embodiments of the present disclosure, a converting 230 step may result in at least a portion of the first metal transferring to a surface of the precursor strand 225, converting it to a nanowire 235 having a surface capable of being coated by a second metal, thereby forming a shell 120 on the core 110, producing a core-shell nanowire 100. In some embodiments of the present disclosure, converting 230 a precursor strand 225 to a nanowire 235 may include exposing a surface of the precursor strand 225 to at least one of ultraviolet (UV) light, ozone, and/or plasma.

In some embodiments of the present disclosure, a precursor strand 225 may be exposed to at least one of UV light, ozone, and/or plasma for a period of time between 1 second and 10 minutes or between 1 second and 1 minute. In some embodiments of the present disclosure, converting 230 a precursor strand 225 to a nanowire 235 may be achieved using ultraviolet light and ozone. In some embodiments of the present disclosure, the UV light used for converting 230 a precursor strand 225 to a nanowire 235 may have a wavelength between 150 nm and 270 nm. In some embodiments of the present disclosure, the UV light used for converting 230 a precursor strand 225 to a nanowire 235 may be provided at an intensity between 20 $mW/cm^2$ and 50 $mW/cm^2$. In some embodiments of the present disclosure, the UV light used for converting 230 a precursor strand 225 to a nanowire 235 may be provided by a light source positioned between 5 mm and 300 mm from the precursor strand 225.

In some embodiments of the present disclosure, a precursor strand 225 may be exposed to an oxidizing liquid to produce a precursor strand 225 to a nanowire 235. The precursor strand 225 is submerged in an oxidizing liquid (e.g. nitric acid, hypochlorite solution, persulfate solution, perchlorate solution, dichromate solution). In some embodiments of the present disclosure converting 230 a precursor strand 225 to a nanowire 235 may be achieved by submerging the the precursor strand 225 for 1 s to 10 minutes at room temperature. In some embodiments of the present disclosure converting 230 a precursor strand 225 to a nanowire 235 may be achieved by submerging the precursor strand 225 for 1 s to 10 minutes at temperatures between 30° C. and 100° C.

In some embodiments of the present disclosure, UV and ozone may be used in tandem to complete the converting 230. This may be accomplished by providing an oxidizing source, e.g., $O_2$ or air, to the precursor strand 225 while irradiating the oxygen environment with a light having a wavelength of about 185 nm (e.g., from a first UV lamp) and a second light having a wavelength of about 254 nm (e.g., from a second UV lamp). The 185 nm light forms ozone from the oxygen in the air and the 254 nm light disassociates the ozone to form singlet atomic oxygen, such that the singlet atomic oxygen affects the surface of the precursor strand 225.

In some embodiments of the present disclosure, a precursor strand 225 may be converted to a nanowire 235 by exposing a surface of the precursor strand 225 to a plasma and a gas comprising argon and oxygen. In some embodiments of the present disclosure, the gas may be provided at a flow rate between greater than 0 $cm^3$/min and less than or equal to 1000 $cm^3$/min. In some embodiments of the present disclosure, a converting 230 step may include exposing a precursor strand 225 to a radio frequency (RF) between 1 kHz and 100 GHz or between 10 MHZ and 20 MHz using power source between 10 W and 600 W. In some embodiments of the present disclosure, when utilizing a plasma, a converting 230 step may be completed in at a pressure between about 0 Torr and about 10 Torr.

In some embodiments of the present disclosure, converting 230 a precursor strand 225 to a nanowire 235 may be achieved by exposing a surface of the precursor strand 225 to at least one of a liquid or a gas, resulting in a chemical reaction that converts the precursor strand 225 to the nanowire 235. For example, a precursor strand 225 may be exposed to hydrogen gas, such that the hydrogen gas reduces a polymer and a metal precursor present in the ink 215 and precursor strand 225 to produce a nanowire 235 constructed of the metal. In another example, a precursor strand 225 may be exposed to an acid, such that the acid at least one of depolymerizes or decomposes the polymer, resulting in the forming of a nanowire 235. In some embodiments of the present disclosure, an acid may include an inorganic acid such as at least one of sulfuric acid, phosphoric acid, nitric acid, hydrochloric acid, and/or acetic acid.

Referring again to FIG. 2, in some embodiments of the present disclosure, a method 200 may include an optional heating 240 step to assist with the converting 230 of a precursor strand 225 and/or a first nanowire 235 to a nanowire 245 that may be subsequently coated to produce a core-shell nanowire 100. Alternatively, in some embodiments of the present disclosure, a heating step 240 may be the only step used to convert a precursor strand 225 to a nanowire 245. Thus, the converting 230 of a precursor strand 225 to a nanowire 245 may be achieved without the use of UV light, ozone, plasma, and/or chemical treatment. Further, in some embodiments of the present disclosure, a heating 240 step may be performed before a converting 230 step using UV/ozone, plasma, and/or a chemical treatment.

In some embodiments of the present disclosure, heating 240 may include heating a substrate 170 and/or the precursor strand 225 to a temperature between 50° C. and 500° C. or between 200° C. and 400° C. In some embodiments of the present disclosure, heating 240 may include maintaining the temperature for a period of time between one second and 10 minutes or between one second and 1 minute. Heating 240 a substrate 170 and/or a precursor strand 225 may be achieved using at least one of conductive heat transfer, radiant heat transfer, and/or convective heat transfer. In some embodiments of the present disclosure, the heating 240 of a substrate 170 and/or precursor strand 225 (and/or a first nanowire 235) may be achieved using conductive heat transfer or radiant heat transfer provided by a hot surface. In some embodiments of the present disclosure, heating 250 may be performed at atmospheric pressure in air and/or an inert gas, with examples of inert gases including of argon, xenon, and/or nitrogen.

Referring again to FIG. 2, after a nanowire 235/245 has been synthesized, a shell 120 may be deposited onto the nanowire 235/245 (i.e., core 110) via a coating step 250. In some embodiments of the present disclosure, coating 250 of a nanowire 235/245 may be achieved by electroless plating of a second metal onto the nanowire 235/245 constructed of a first metal. Electroless plating may be achieved by immersing the nanowire 235/245 and the substrate 170 into a solution. In some embodiments of the present disclosure, a solution used for electroless plating may be an aqueous solution. In some embodiments of the present disclosure, electroless plating may be performed in an aqueous solution maintained at a temperature between 22° C. and 100° C. or between 30° C. and 40° ° C., for a period of time between 1 minute and 4 hours or between 5 minutes and 3 hours.

Figure 3:
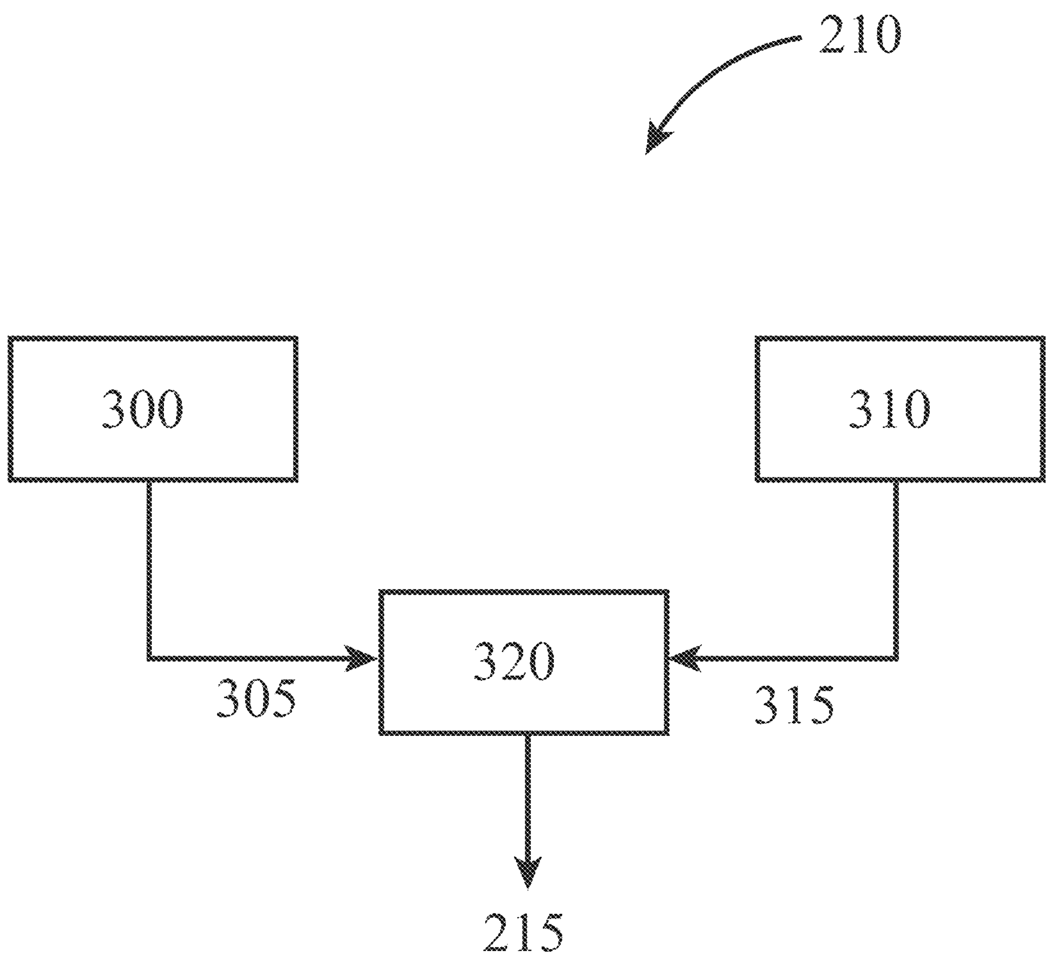
FIG. 3 illustrates a method for making an ink for use in the method illustrated in FIG. 2, according to some embodiments of the present disclosure.

FIG. 3 illustrates a method for making an ink, the ink preparation 210 step illustrated in FIG. 2, according to some embodiments of the present disclosure. As described above, in some embodiments of the present disclosure, an ink 215 may include two components: 1) at least one of a metal and/or a metal precursor and 2) at least one polymer. As shown in FIG. 3, such an ink 215 may be produced by preparing separately 1) a metal ink 305 containing at least one of a metal and/or a metal precursor and 2) a polymer solution 315 containing at least one polymer. Once made, the ink 215 may be produced by combining 320 the metal ink 305 with the polymer solution 315. Among other things, this approach may prevent unwanted side reactions from occurring. Nevertheless, in some embodiments of the present disclosure, an ink 215 may be prepared by combining in a single mixture, a metal precursor, a polymer, and a solvent. In some embodiments of the present disclosure, a metal ink may include at least one of ammonium hydroxide, water, and formic acid. In some embodiments of the present disclosure, a polymer solution may include at least one of water or ethanol.

In some embodiments of the present disclosure, a metal precursor used to produce a metal ink 305 in a metal ink preparation step 300 may include a salt formed from a metal cation and an anion. In some embodiments of the present disclosure, a metal cation of a salt used in a metal ink 305 may include at least one of silver, copper, gold, aluminum, nickel, platinum, palladium, zinc, and/or iron. In some embodiments of the present disclosure, an anion of a salt used in a metal ink 305 may include at least one of a carboxylate, a halide, carbonate, nitrate, citrate, oxalate, hexafluorophosphate, sulfate, and/or thiosulfate. Examples of a carboxylate suitable for use in the salt of a metal ink 305 include at least one of formate, acetate, propionate, buryate, and/or neodecanoate. Examples of a halide include at least one of fluoride, chloride, bromide, and/or iodide.

In some embodiments of the present disclosure, a polymer provided in a polymer solution preparation step 310 to produce a polymer solution 315 may include at least one of a polyester, poly(ethylene oxide) (PEO), polyvinylpyrrolidone (PVP), polyvinyl butyral, poly(vinyl acetate) poly (vinylidene fluoride), polystyrene, and/or polyacrylonitrile. In example of a polyester is polyethylene terephthalate (PET).

Figure 4:
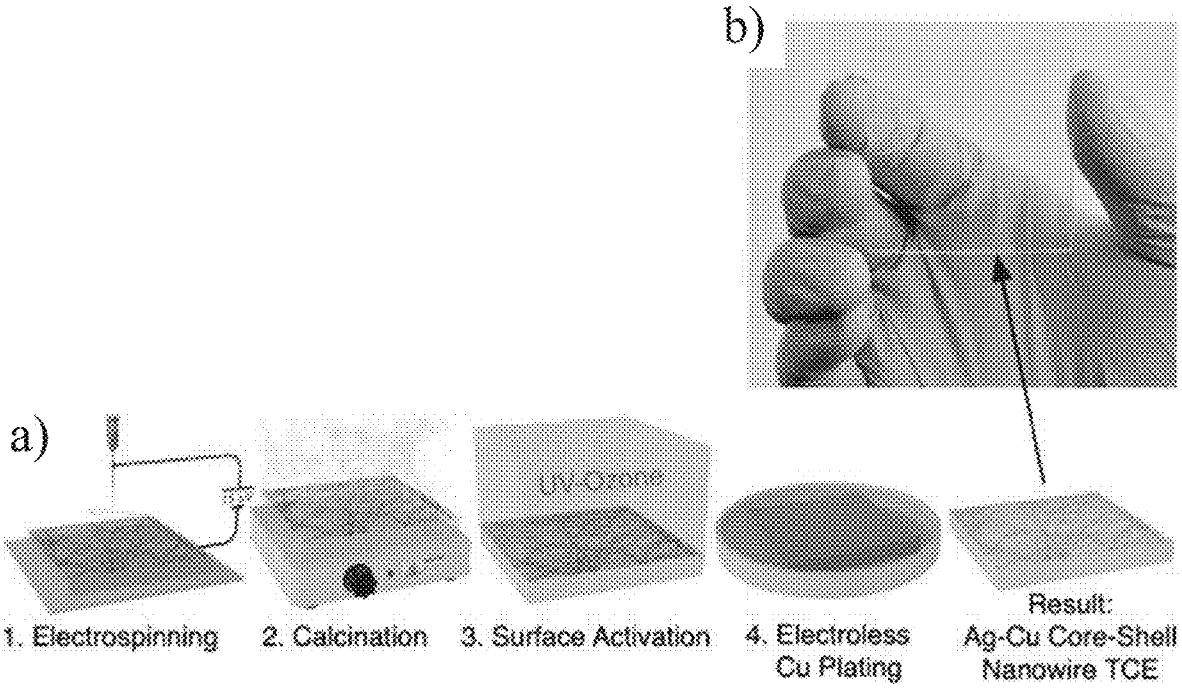
FIG. 4 illustrates (Panel a) a schematic of the TCE fabrication process and (Panel b) a photograph showing real-world transparency and color neutrality of a nanowire TCE, according to some embodiments of the present disclosure.

The methods described above have been successfully demonstrated and are described more detail here. Panel a of FIG. 4 illustrates an adaptation of the method previously illustrated in FIG. 2. In this example, the method included electrospinning (depositing 220), calcination (heating 240), surface activation (converting 230), and electroless copper deposition (coating 250). For the depositing 220, an ink that included a polymer and reactive silver ink 215 was electrospun onto a clean glass substrate 170, resulting in precursor strands 225 deposited on the substrate 170. After electrospinning, a 300° C. hotplate was used for heating 240 the precursor strands 225 to vaporize the polymers and yield silver nanowires 235. Next, a UV-ozone converting 230 step was used to activate the silver (the first metal) nanowire surface for quicker and more uniform electroless copper deposition for the coating 250 step. Copper (the second metal) was directly plated onto the silver nanowires to yield an Ag—Cu core-shell nanowire network 160, with the core 110 being the silver nanowire, coated with a copper shell 120. The resultant nanowire network is nearly indistinguishable from bare glass to the naked eye (see Panel b of FIG. 4). The highest performing TCE exhibited a $R_s$=0.33 $\Omega \cdot sq^{-1}$ and T of 86% (FOM=652×$10^{-3} \cdot \Omega^{-1}$).

The nanowire TCE fabrication processes are very well suited for manufacturing processes. The present work uniquely forms core-shell structures and targets TCE applications. Replacing traditional particle-based metal inks with reactive inks for direct metallization is advantageous for several reasons, including: (1) higher ink stability, (2) less expensive ink synthesis, and (3) fewer ink contaminants. Referring again to Panel a of FIG. 4, when only steps 1 (depositing 220) and 2 (heating 240) were used to produce silver nanowire networks, the resultant device demonstrated a relatively low FOM (171.6× $10^{-3} \cdot \Omega^{-1}$).

It was hypothesized that junction resistances were limiting the performance, which an additional electroless deposition (coating 250) step could remedy by, among other things, forming a core-shell nanowire. This resulted in a ~2.8× higher FOM while also increasing the nanowire tunability. Copper was chosen as the electroless plating metal because it is inexpensive and highly conductive. However, other plating metals like silver or nickel may also be effective. The core-shell structure is a result of the two different metallization methods. It is possible to electrolessly deposit copper onto the silver nanowires immediately after calcination. However, as shown herein, it was determined that a surface activation (i.e., converting 230 step) can result in more uniform plating (see FIG. 5). UV-ozone was selected for the activation step because it is a low-cost, non-vacuum process.

Figure 6:
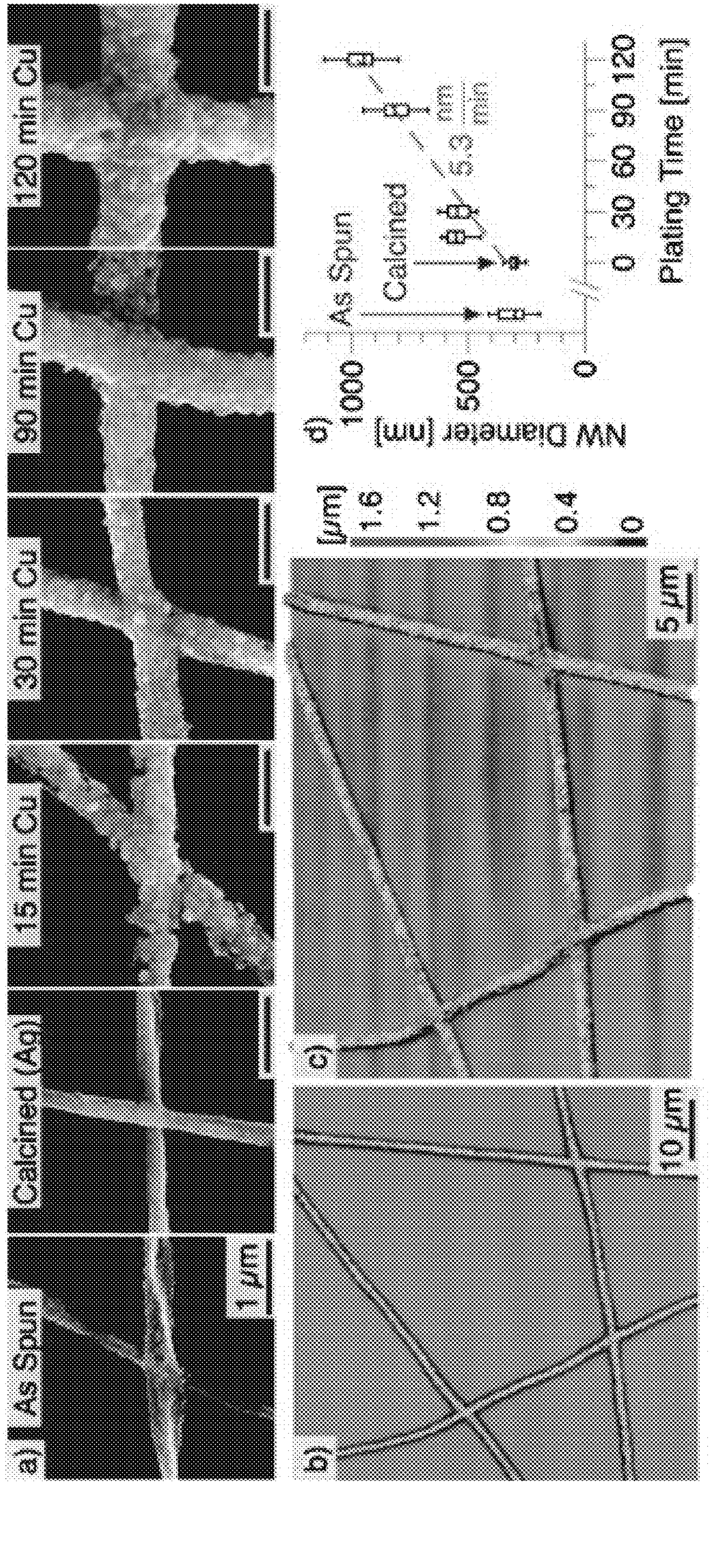
FIG. 6 illustrates (Panel a) SEM images showing nanowire junctions after electrospinning, calcination, and electroless copper plating for 15 min to 120 min; (Panel b) an optical image of a sample after copper plating shows three uniformly fused junctions; (Panel c) a three-dimensional height map of nanowires after copper plating; and (Panel d) a plot of nanowire diameter vs. plating time, according to some embodiments of the present disclosure. The diagonal dashed line is a linear regression of the data.
Figure 7:
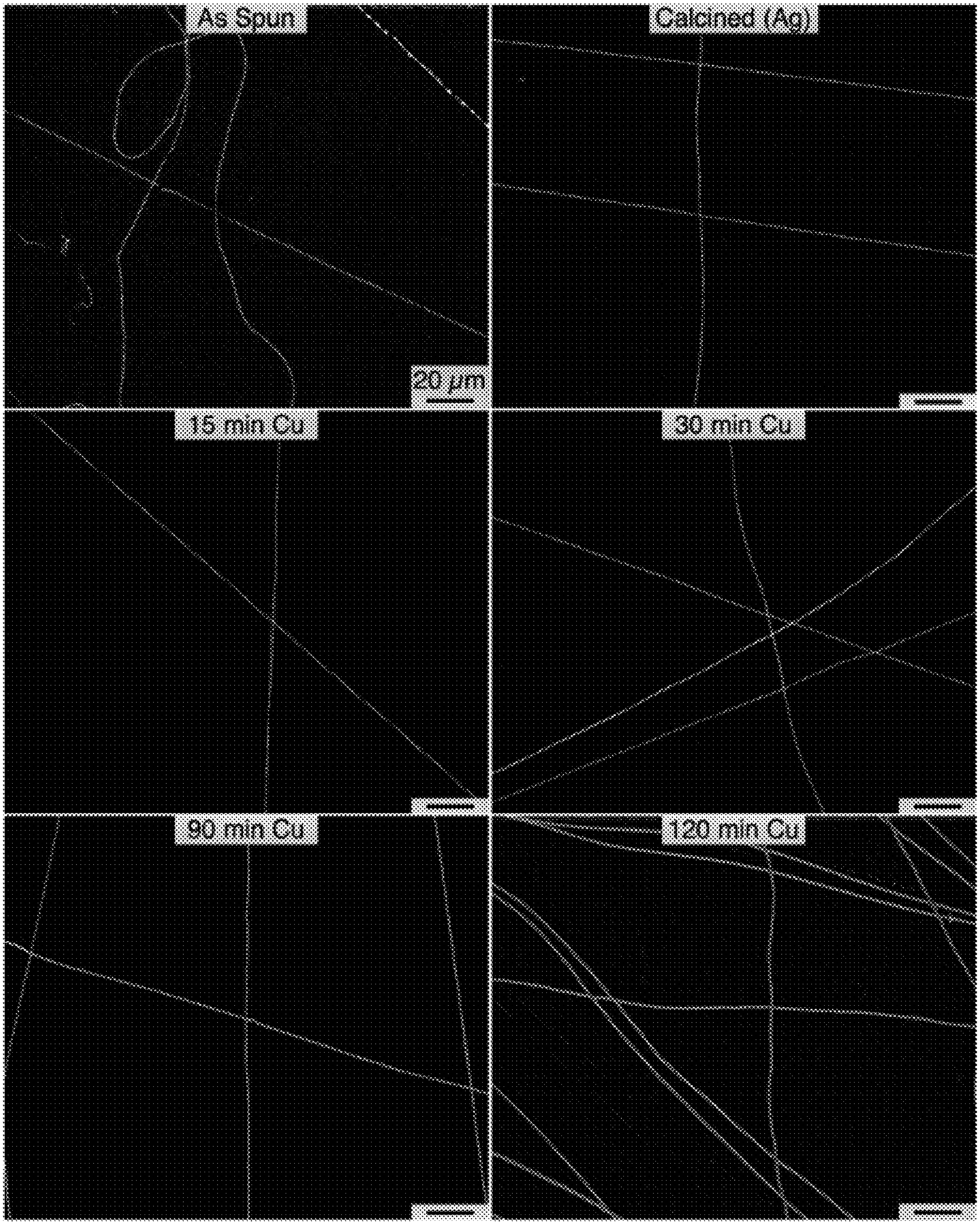
FIG. 7 low magnification SEM images that show multiple wire junctions for the as-spun, calcined, and copper plated nanowires, according to some embodiments of the present disclosure.

Electroless plating may contributes to lower $R_s$ in two ways: (1) decreasing the resistance of individual nanowires by increasing their current carrying cross-section and (2) decreasing the contact resistances between nanowires by fusing the junctions. SEM images of nanowire junctions illustrate the junction fusing capability of copper plating (see Panel a of FIG. 6). The calcined SEM image shows individually stacked silver nanowires with unfused junctions. The copper plating uniformly coated all surfaces and provides a low-resistance path between nanowires. This allows electrons to move through the silver core and copper shell of an individual wire, then transfer between wires through the copper shell. Importantly, all junctions fused uniformly after copper plating (see Panel b of FIG. 6). The final core-shell nanowires illustrated have a width-to-height ratio of ~1 (see Panel c of FIG. 6), with slightly raised junctions due to the stacked wire starting condition (see FIG. 7).

Figure 8:
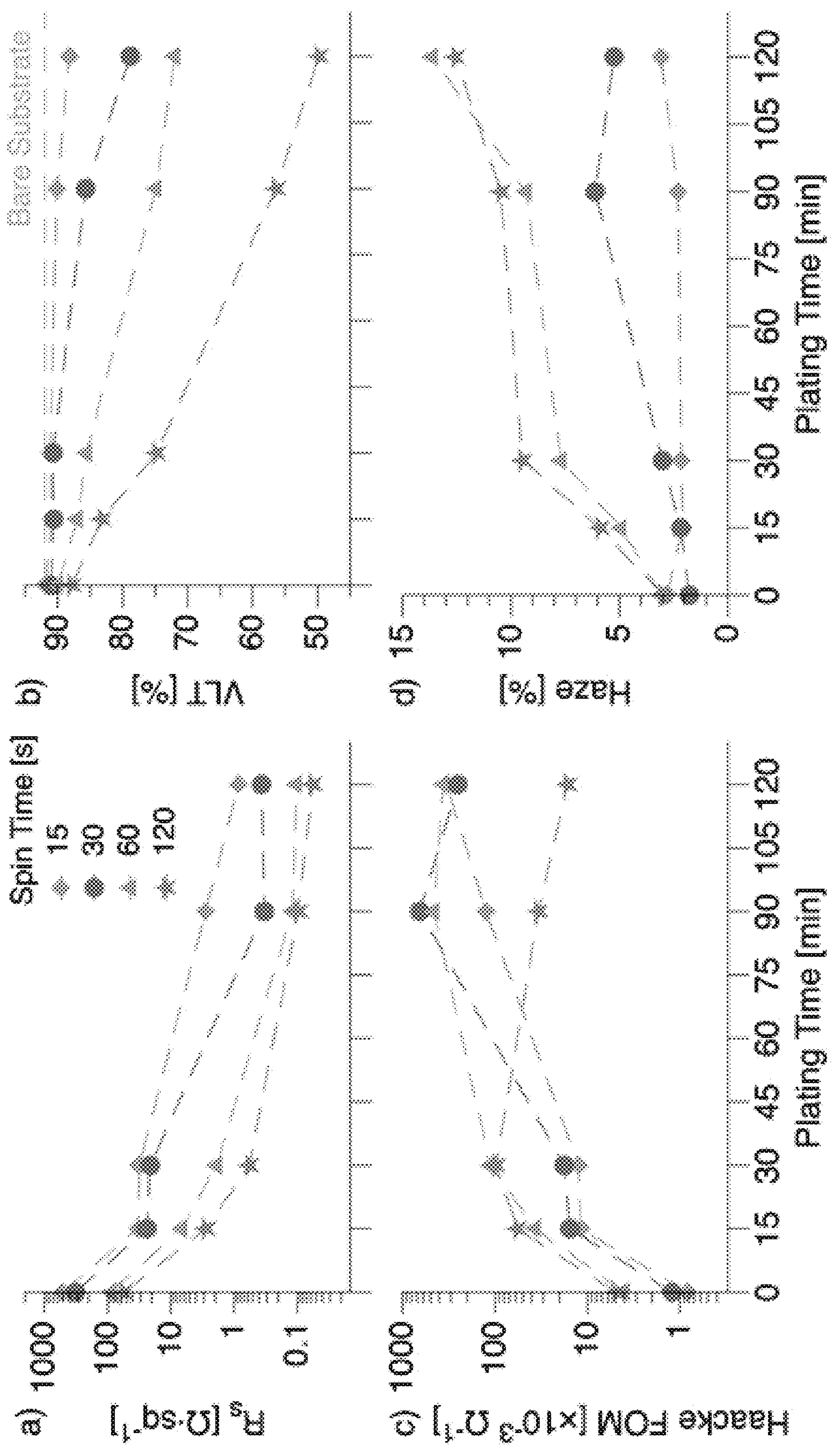
FIG. 8 illustrates results from an electrospinning and electroless deposition parameter space investigation: (Panel a) illustrates $R_s$ vs. copper plating time; (Panel b) VLT vs. copper plating time; and (Panel c) Haacke FOM vs. copper plating time; and (Panel d) optical haze vs. plating time, according to some embodiments of the present disclosure.

Comparing the nanowire growth rate to the decrease in $R_s$ provides evidence that junction fusing is the main contribution of copper plating (see Panel a of FIG. 8). The formula for the resistance of a single nanowire is: r=ρ·L·A−1, where r is the resistance, p is the material resistivity, L is the length, and A is the cross-sectional area. If increasing area were the primary contribution, we would expect a one-to-one relationship between area increase and $R_s$ decrease. However, from calcination to 120 min of copper plating, the nanowire cross-sectional area increased by ~10× (diameter increased from ~300 nm to ~950 nm, Panel d of FIG. 6), whereas the $R_s$ decreased by ~700× (244 Ω·sq−1 to 0.34 Ω·sq−1, Panel a of FIG. 8). The significant Rs decrease compared to the cross-sectional area increase indicates that cross-sectional area is a minimal contribution of copper plating.

Electrospinning (depositing 220) duration and electroless plating (coating 250) duration are two of the most impactful fabrication parameters for the Ag—Cu nanowires described herein. Electrospinning time affects the network density, whereas the plating duration affects the individual wire thicknesses and junction resistances. At the extreme limit, a TCE with a low wire density and a high plating time can be conceptualized as a single nanowire spanning the substrate, and a TCE with high density and low plating time can be thought of as a continuous thin silver film. The former TCE will have visible wires and poor uniformity, whereas the latter will have low transmittance since all light must pass through a metal layer. To find the optimal conditions for this system, a parameter space investigation was completed with four different electrospinning durations (between 15 seconds and 120 seconds) and five different continuous plating times (between 0 minutes and 120 minutes) (see FIG. 8 and Table 1). The upper limit for plating time was limited to 120 minutes because the copper plating solution homogeneously nucleated copper particles that physisorbed onto the substrate when longer plating times were attempted.

TABLE 1

Raw data from the electrospinning time and copper plating time parameter space investigation. Data includes Visible Light Transmittance (VLT), optical haze, sheet resistance ($R_s$), $R_s$ change after six months, and the Haacke Figure of Merit (FOM).

| Spin Time [s] | Plating Time [min] | VLT [%] | Haze [%] | $R_s$ [Ω/sq] | $R_s$ After 6 Months [Ω/sq] | $R_s$ Change After 6 Months [%] | Haacke FOM [$\times 10^{-3} \cdot \Omega^{-1}$] |
|---|---|---|---|---|---|---|---|
| 15 | 0 | 91.8 | 2.79 | 512.247 | | | 0.828 |
| 15 | 15 | 90.9 | 2.07 | 32.757 | 33.524 | 2.34 | 11.808 |
| 15 | 30 | 91.1 | 2.15 | 31.558 | 31.870 | 0.99 | 12.413 |
| 15 | 90 | 90.1 | 2.29 | 2.806 | 2.830 | 0.86 | 125.619 |

TABLE 1-continued

Raw data from the electrospinning time and copper plating time parameter space investigation. Data includes Visible Light Transmittance (VLT), optical haze, sheet resistance ($R_s$), $R_s$ change after six months, and the Haacke Figure of Merit (FOM).

| Spin Time [s] | Plating Time [min] | VLT [%] | Haze [%] | $R_s$ [Ω/sq] | $R_s$ After 6 Months [Ω/sq] | $R_s$ Change After 6 Months [%] | Haacke FOM [$\times 10^{-3} \cdot \Omega^{-1}$] |
|---|---|---|---|---|---|---|---|
| 15 | 120 | 88.2 | 3.08 | 0.850 | 0.903 | 6.25 | 334.290 |
| 30 | 0 | 91.0 | 1.76 | 320.106 | 368.559 | 15.14 | 1.211 |
| 30 | 15 | 90.6 | 2.16 | 23.910 | 24.334 | 1.77 | 15.500 |
| 30 | 30 | 90.7 | 3.01 | 21.033 | 21.306 | 1.30 | 17.817 |
| 30 | 90 | 85.7 | 6.11 | 0.329 | 0.346 | 5.00 | 651.935 |
| 30 | 120 | 78.8 | 5.24 | 0.366 | 0.387 | 5.81 | 251.824 |
| 60 | 0 | 90.0 | 3.06 | 87.721 | 92.488 | 5.43 | 3.983 |
| 60 | 15 | 87.0 | 4.92 | 6.752 | 6.912 | 2.37 | 36.835 |
| 60 | 30 | 85.6 | 9.46 | 1.888 | 1.927 | 2.09 | 112.228 |
| 60 | 90 | 74.9 | 9.30 | 0.120 | 0.121 | 0.74 | 460.953 |
| 60 | 120 | 72.0 | 13.62 | 0.103 | 0.116 | 11.86 | 362.561 |
| 120 | 0 | 87.9 | 2.99 | 55.736 | 58.000 | 4.06 | 4.934 |
| 120 | 15 | 83.2 | 5.88 | 2.791 | 2.853 | 2.26 | 57.273 |
| 120 | 30 | 74.8 | 7.69 | 0.566 | 0.566 | 0.01 | 97.511 |
| 120 | 90 | 56.4 | 10.47 | 0.096 | 0.103 | 6.54 | 33.788 |
| 120 | 120 | 49.8 | 12.56 | 0.057 | 0.058 | 2.33 | 16.455 |

Figure 9:
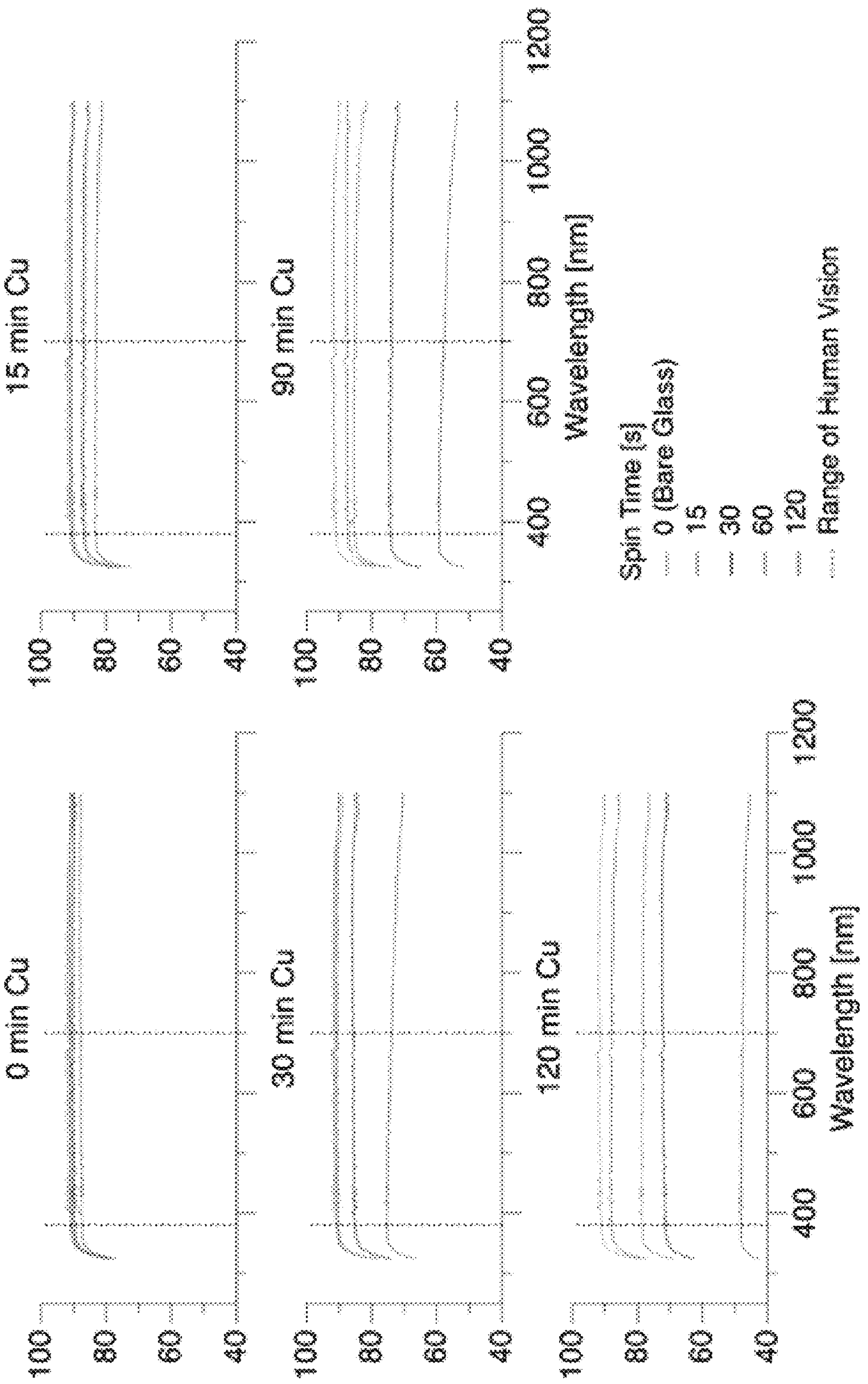
FIG. 9 illustrates full transmittance spectra of the TCEs from as functions of electrospinning times and plating times, according to some embodiments of the present disclosure.

As expected, greater electrospinning times or plating times yielded lower $R_s$ and lower visible light transmittance (VLT) values. $R_s$ decreased approximately exponentially with plating time, whereas VLT decreased with a near-linear trend in time (see Panels a and b of FIG. 8). The non-linear $R_s$ decrease shows how junction fusing provided diminishing performance returns. Initially, copper plating rapidly reduced $R_s$ by providing new pathways for electrons to travel. Once the junctions were sufficiently fused, additional plating only improved $R_s$ by increasing the wire's current carrying cross-sectional area. Larger wires also blocked more photons and decreased VLT. Indeed, the linear wire diameter growth rate (see Panel d of FIG. 6) correlates well with the linear VLT decrease. Unlike many thin-film oxide-based TCEs, which have wavelength-dependent features due to doping or interference, the transmission spectra of the Ag—Cu core-shell nanowires described herein are nearly flat across the visible spectrum (see FIG. 9). As a result, the VLT and $T_{550}$ values were within 1% for all samples. The flat transmission spectra also result in a color-neutral appearance (see Panel b of FIG. 4), making these TCEs applicable to aesthetic applications like displays and windows.

The Haacke FOM sharply increased upon initial copper plating due to rapid $R_s$ improvement caused by junction fusing (see Panel c of FIG. 8). However, the $R_s$ improvement rate decreased as plating continued, and the VLT loss rate remained the same. Additional plating reduced the FOM after a critical point. Greater electrospinning times showed shorter critical plating times. The parameter space investigation yielded a maximum FOM of $652\times10^{-3}\cdot\Omega^{-1}$ ($R_s$=0.33 $\Omega\cdot sq^{-1}$, VLT=86%) at 30 seconds of electrospinning followed by 90 minutes of copper plating. Notably, the $652\times10^{-3}\cdot\Omega^{-1}$ FOM is a state-of-the-art result for nanowire TCEs, which was fabricated using all-atmospheric fabrication processes and inexpensive materials.

In addition to $R_s$, VLT, and FOM, haze is an important consideration for TCEs. Low haze (<3%) is desired for displays and window applications. The haze of Ag—Cu core-shell nanowire networks tended to increase with greater plating and electrospinning times (see Panel d of FIG. 8). After calcination, all samples had ≤3% haze. After copper plating, the haze increased to a maximum of 3.1%, 6.1%, 13.6%, and 12.6% for samples with 15, 30, 60, and 120 seconds of electrospinning, respectively. Metal nanowire TCEs can exhibit high haze because sub-wavelength features strongly scatter light. Strategies exist to reduce haze in metal nanowire TCEs. However, in some applications like photovoltaics, high haze is desirable. Solar cells benefit from top electrodes with high haze because the scattered light increases absorption in the active layer and leads to increased efficiency.

Flexibility is an advantage of nanowire networks over ITO. ITO performance significantly degrades under bending due to cracks that form under small strains (<2%). These cracks propagate and grow as strain or bending cycles increase. On the other hand, metal nanowire networks show excellent bending durability due to the ductility of metals and reduced dislocation nucleation and accumulation in nanowires.

Figure 10:
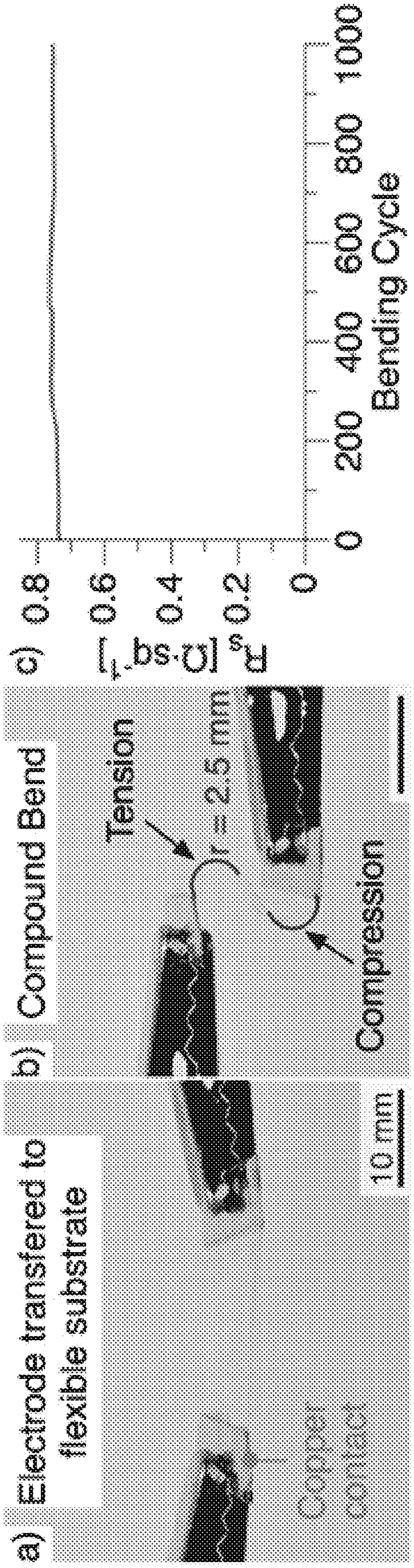
FIG. 10 illustrates mechanical durability evaluation results: (Panel a) a photograph of electrode after transferring onto a polypropylene substrate; (Panel b) a photograph of a TCE under 2.5 mm radius compound bending, where the arrows indicate which areas are under compression and tension; and (Panel c) sheet resistance as a function of bending cycles, according to some embodiments of the present disclosure. Sheet resistance increased by 2.5% after 1000 bending cycles.
Figure 11:
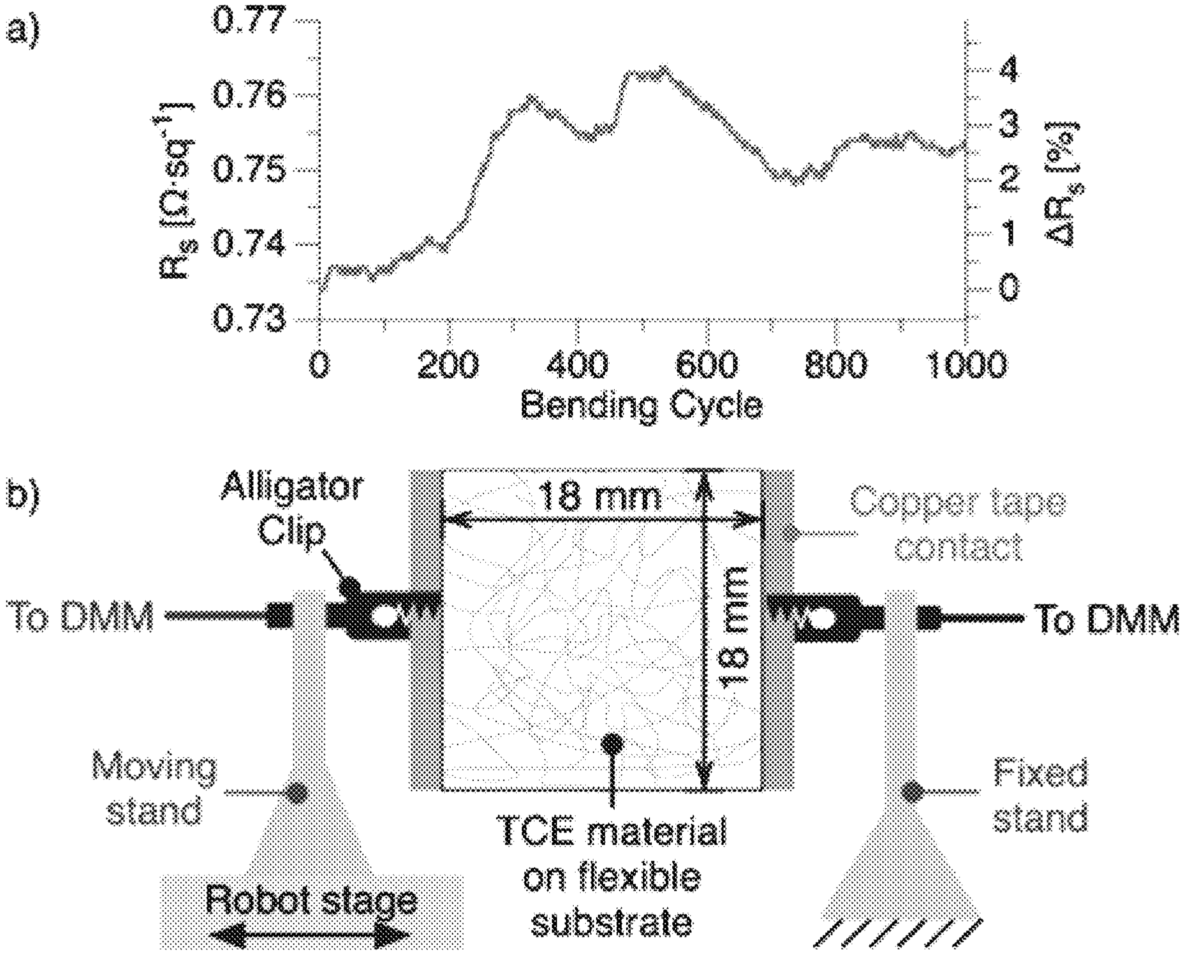
FIG. 11 illustrates (Panel a) a magnified graph of $R_s$ vs. bending cycle. Sheet resistance increased by 4% after 500 bending cycles, then recovered slightly to 2.5% after 1000 cycles; and (Panel b) illustrates a schematic of bending experimental setup, according to some embodiments of the present disclosure. Alligator clips attached to copper tape contacts were used for in situ sheet resistance measurements with a Digital Multimeter (DMM). The alligator clips were attached to a fixed and moving stand to actuate the bending cycles.

For these reasons, the bending durability of the Ag—Cu core-shell nanowire TCEs was evaluated by transferring the electrodes onto flexible substrates and conducting bending experiments. The transfer process used clear polypropylene tape to delaminate the electrodes from the glass. Glass substrates that were rigorously cleaned failed to allow delamination of the electrodes due to the strong adhesion between the electrodes and glass. The electrodes showed weaker adhesion to uncleaned glass substrates and enabled the tape transfer process (see Panel a of FIG. 10). The transferred electrode was subjected to ~2.5 mm radius compound bending cycles (see Panel b of FIG. 10). The compound bend allowed evaluation of the TCE under compression and tension simultaneously. The resistance increased from 734 $m\Omega\cdot sq^{-1}$ to 753 $m\Omega\cdot sq^{-1}$ after 1000 bending cycles, which represents a small 2.5% increase in sheet resistance and high bending tolerance (see Panel c of FIG. 10 and FIG. 11). 2.5% increase in sheet resistance is comparable to the state-of-the-art for nanowire electrodes under similar bending conditions.

Chemical durability is a concern for metal nanowire TCEs, especially copper, which is known to oxidize in air. Nanosized metals are reactive in atmospheric oxygen and water because of their large surface-to-volume ratios. The core-shell nanowires described herein have diameters ($D_c$) between 500 nm and 1000 nm. The larger diameter of our materials yields enhanced chemical durability. Atmospheric degradation of the Ag—Cu core-shell TCEs described herein was investigated by measuring the $R_s$ of each sample six months after fabrication (see Table 1). The devices using core-shell nanowires having diameters greater than 500 nm performed significantly better than smaller diameter nanowire electrodes with an $R_s$ increase of 4% or less after >4000 h (6 months).

Figure 14:
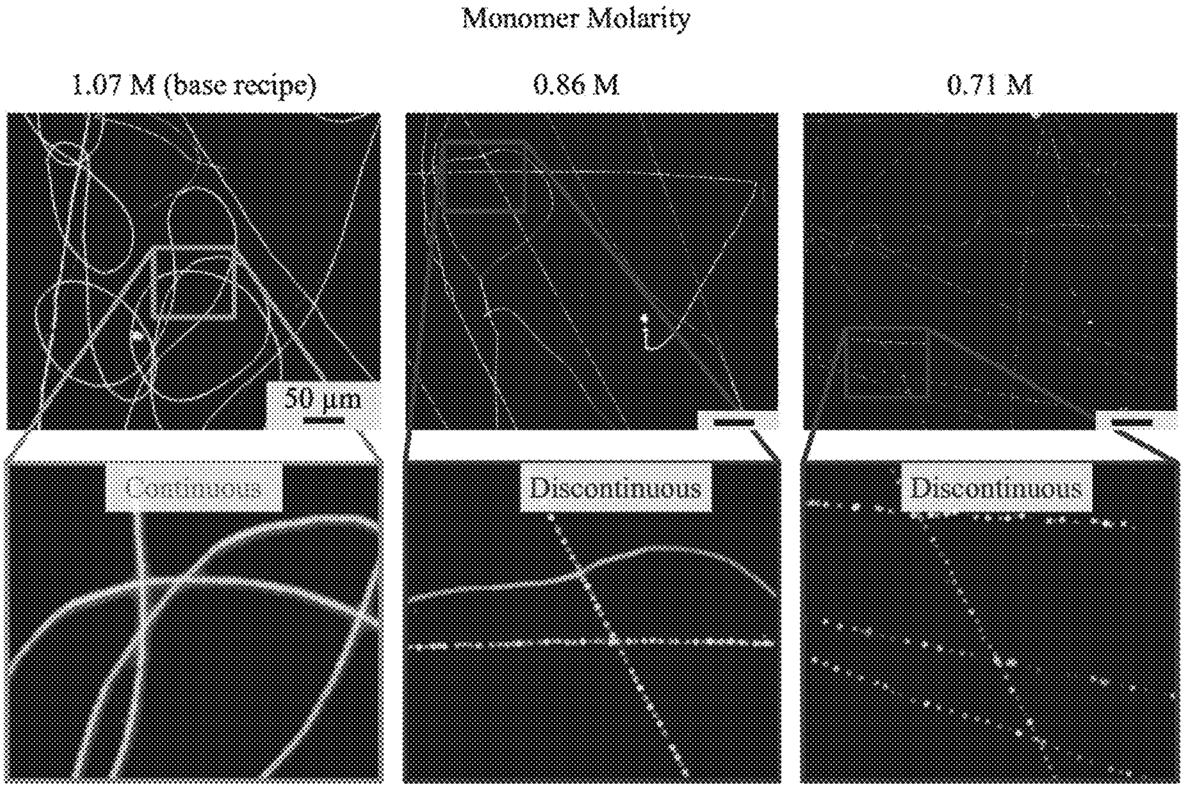
FIG. 14 illustrates electrospun nanowires, according to some embodiments of the present disclosure.

FIG. 14 illustrates electrospun nanowires generated from diluted solutions based on the following recipe: 405 mg of silver acetate, 1.01 ml of ammonium hydroxide (28-30% in water), 0.08 ml of formic acid (≥98%), 40.0 mg poly (ethylene oxide) (PEO, 900.0 kg/mol), 50.0 mg polyvinylpyrrolidone (PVP, 1300.0 kg/mol), 0.5 ml ethanol (100%), and 0.5 ml deionized water.

Figure 15:
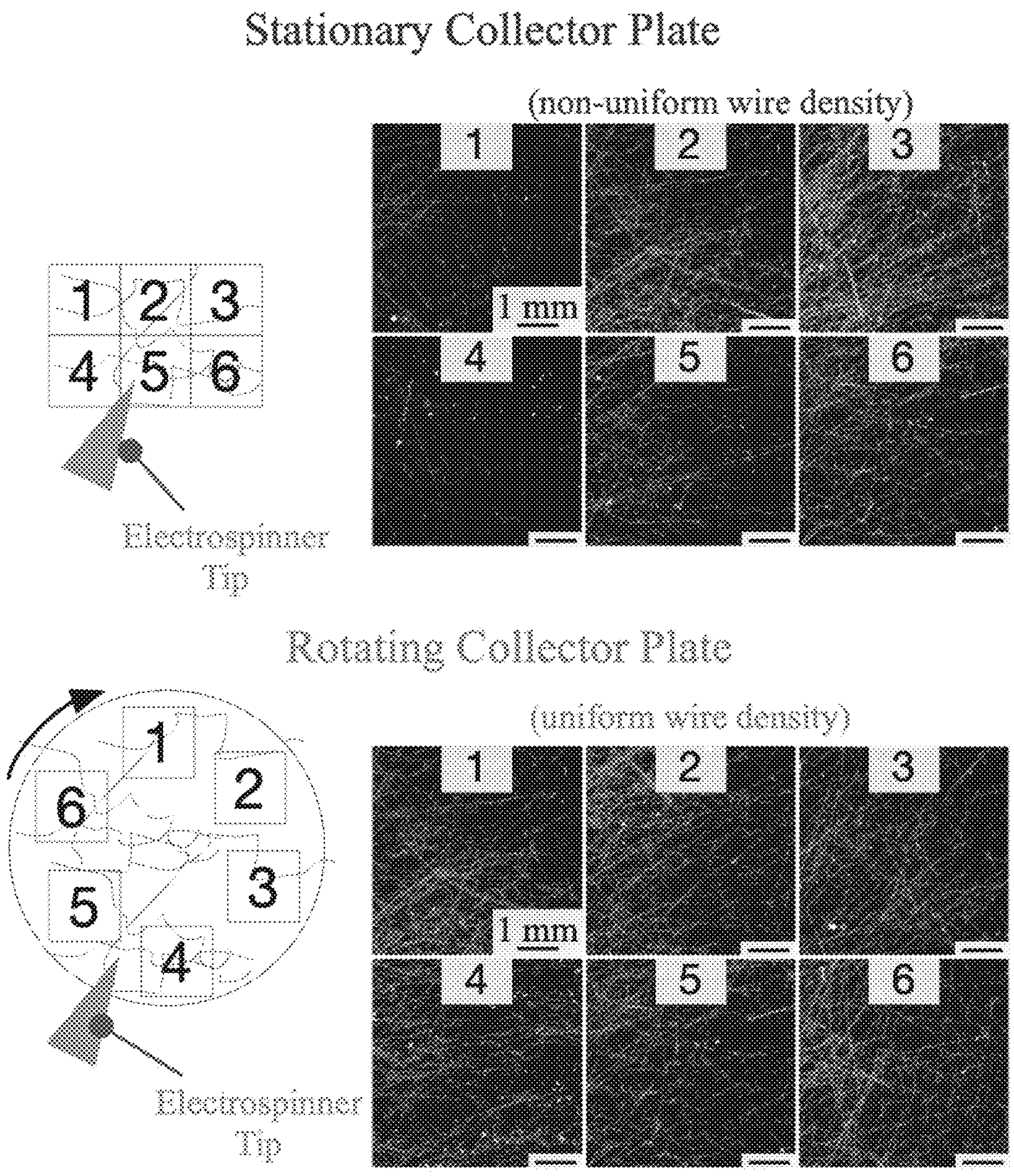
FIG. 15 illustrates optical images comparing nanowire networks, according to some embodiments of the present disclosure.

FIG. 15 illustrates optical images comparing nanowire arrays produced with stationary and rotating collector plates. Six samples were electrospun simultaneously. The stationary collector plate resulted in considerable variations in wire density among samples, while the rotating plate achieved uniform wire densities across all six samples.

Figure 16:
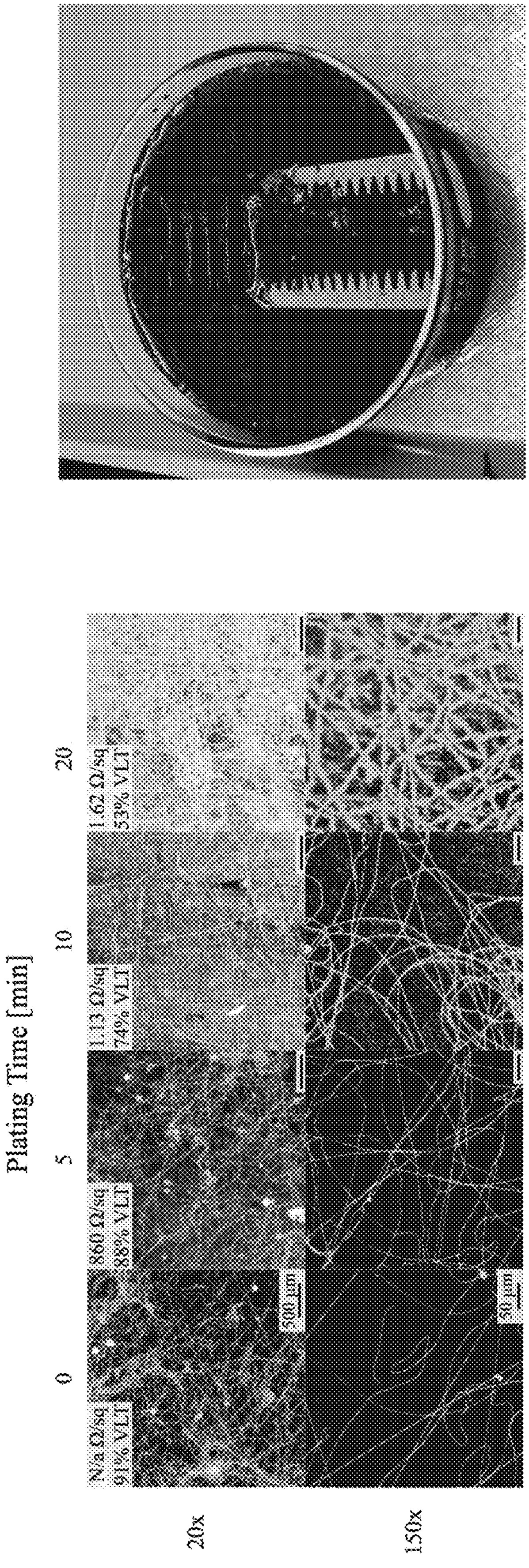
FIG. 16 illustrates networks of Ag—Cu core-shell nanowires, according to some embodiments of the present disclosure.

FIG. 16 illustrates results using an electroless plating solution. The solution was composed of DI Water (100 ml), Potassium Sodium Tartrate Tetrahydrate (14,000 mg), Copper (II) Sulfate Pentahydrate (3,000 mg), Sodium Hydroxide (4,000 mg), and Formaldehyde (10 ml). The solution exhibited rapid plating and homogeneous nucleation within 5 minutes. The right image shows the plating solution after 20 minutes with copper particles plating out of solution. The solution used in our subsequent work is more diluted and utilizes sodium carbonate as a buffer.

Figure 17:
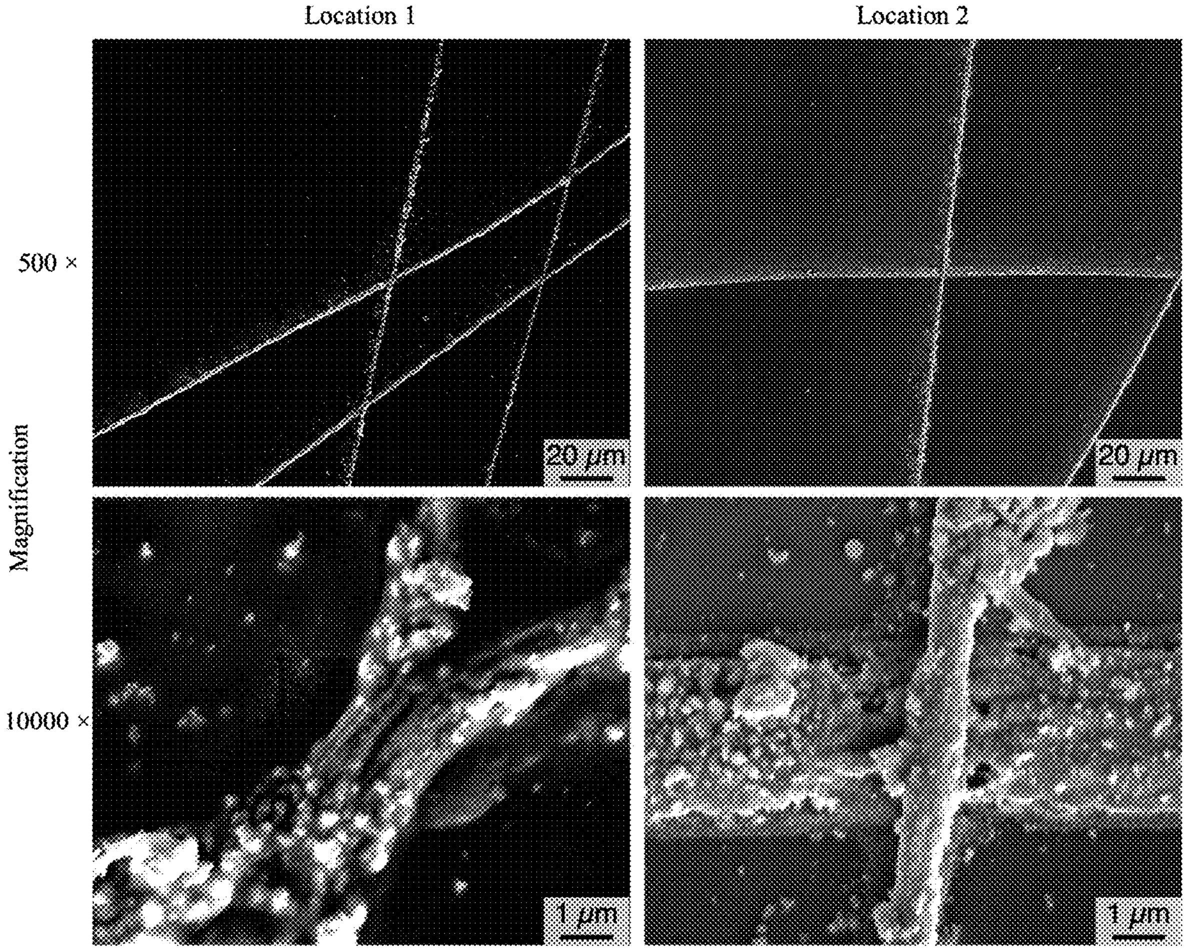
FIG. 17 illustrates SEM images of TCEs fabricated using methods described herein, according to some embodiments of the present disclosure.

FIG. 17 illustrates SEM images depicting a TCE fabricated using identical techniques as in the paper, excluding the calcination step. The electrospinning and plating durations were 30 s and 90 min, respectively (as per optimal paper performance). The sample had a sheet resistance of 5.53 Ω/sq, a visible light transmittance of 83.1%, and a FOM of $28.40\times10^{-3}\cdot\neq^{-1}$. Further optimization could improve the performance of TCEs fabricated without the calcination step.

Figure 18:
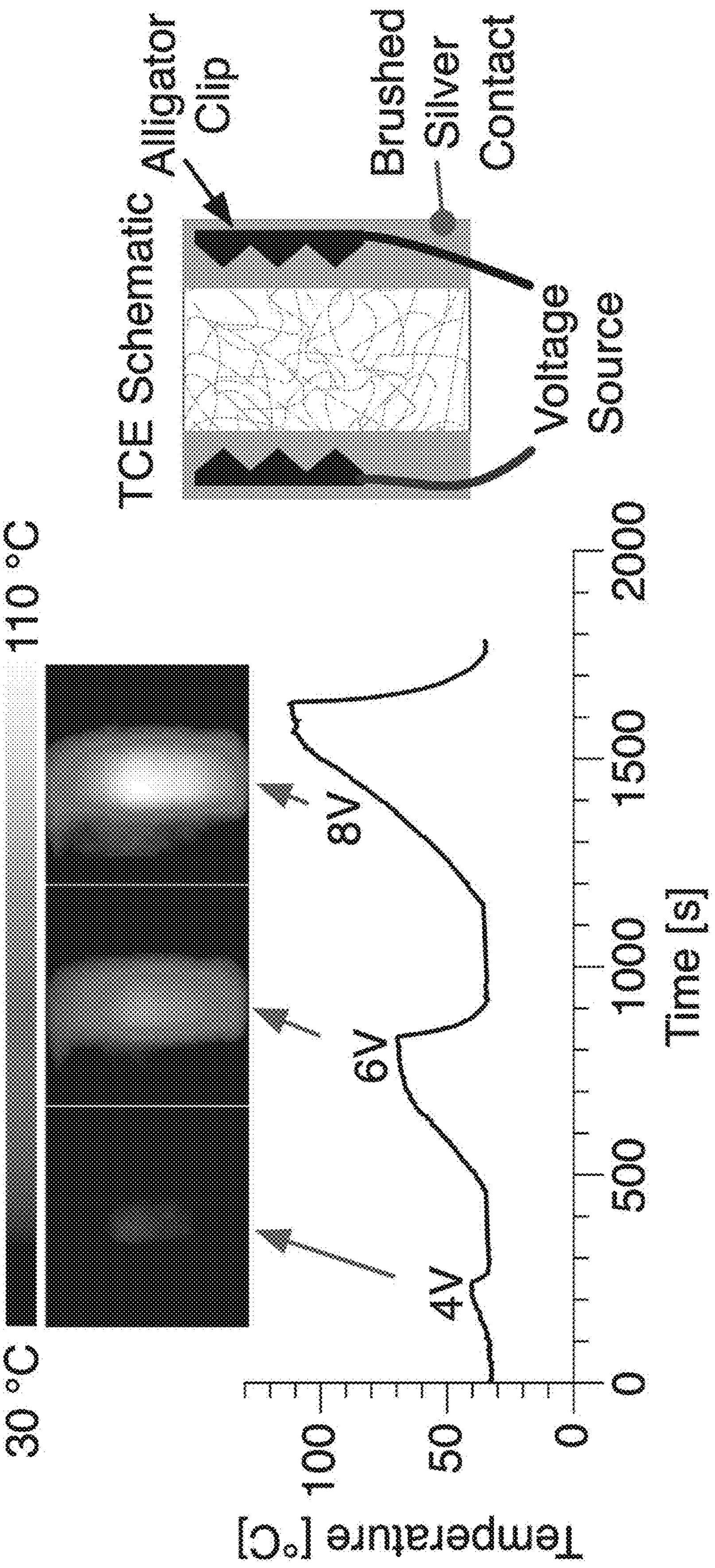
FIG. 18 illustrates a temperature vs. time plot for a TCE with $R_s$ of 8.4 $\Omega\cdot sq^{-1}$, according to some embodiments of the present disclosure.

FIG. 18 illustrates a temperature vs. time plot for a TCE from this work with $R_s$ of 8.4 $\Omega\cdot sq^{-1}$. The label above each peak indicates the applied voltage. The inset thermal images show the heat distribution at the peak temperature for each voltage. The TCE schematic shows the interconnection scheme for the heater experiments. This is a heater a voltage was applied across the nanowire network and the temperature of the substrate/wires was increased by joule heating.

Methods:

Electrospinning Solution Preparation: The electrospinning solution (ink 215) was produced based on the procedure developed by Kiremitler et al. (*Journal of Industrial and Engineering Chemistry* 95 (2021) 109-119) The ink had three main constituents: reactive silver ink, two polymers, and water and ethanol as solvents. The reactive silver ink (metal ink 305) and polymer solution 315 separately, then combined them before electrospinning. The reactive silver ink was made following the ink synthesis procedure developed by Walker et al. (*J. Am. Chem. Soc.* 2012, 134, 1419-1421). First, 2.00 g of silver acetate (anhydrous 99%, Alfa Acsar) was weighed using an analytical balance and added it to a plastic test tube. Next, 5.0 ml of ammonium hydroxide (28-30%, ACS grade, Sigma Aldrich) was added and vortex mixed until the salt was completely dissolved. Then, 0.40 ml of formic acid (≥98%, ACS grade, Sigma Aldrich) was added dropwise over 60 seconds, vortex mixing between drops. After synthesis, the test tubes remained undisturbed at room temperature for 12 hours in a dark environment before filtering the supernatant through a 450 nm syringe filter and storing them at 4° C. until use. The polymer solution was made by mixing 40.0 mg poly(ethylene oxide) (PEO, 900.0 kg/mol Sigma-Aldrich), 50.0 mg polyvinylpyrrolidone (PVP, 1300.0 kg/mol Sigma-Aldrich), 0.5 ml ethanol (100%, Fisher Scientific), and 0.5 ml deionized water in a capped syringe. All chemicals were used as received without further purification. The syringe was vortex mixed for 2 hours, and the resultant solution was left undisturbed for at least 24 hours to allow the polymers to dissolve fully. On the day of electrospinning, the 1.5 ml of the reactive ink was added to the syringe mixture and vortex mixed for 30 minutes. Then the syringe was inverted to let all bubbles rise to the top before attaching a needle to the syringe for electrospinning. By making the solution in the same syringe used for electrospinning, the possibility of losing constituents when transferring the small volumes between different containers was eliminated.

Figure 12:
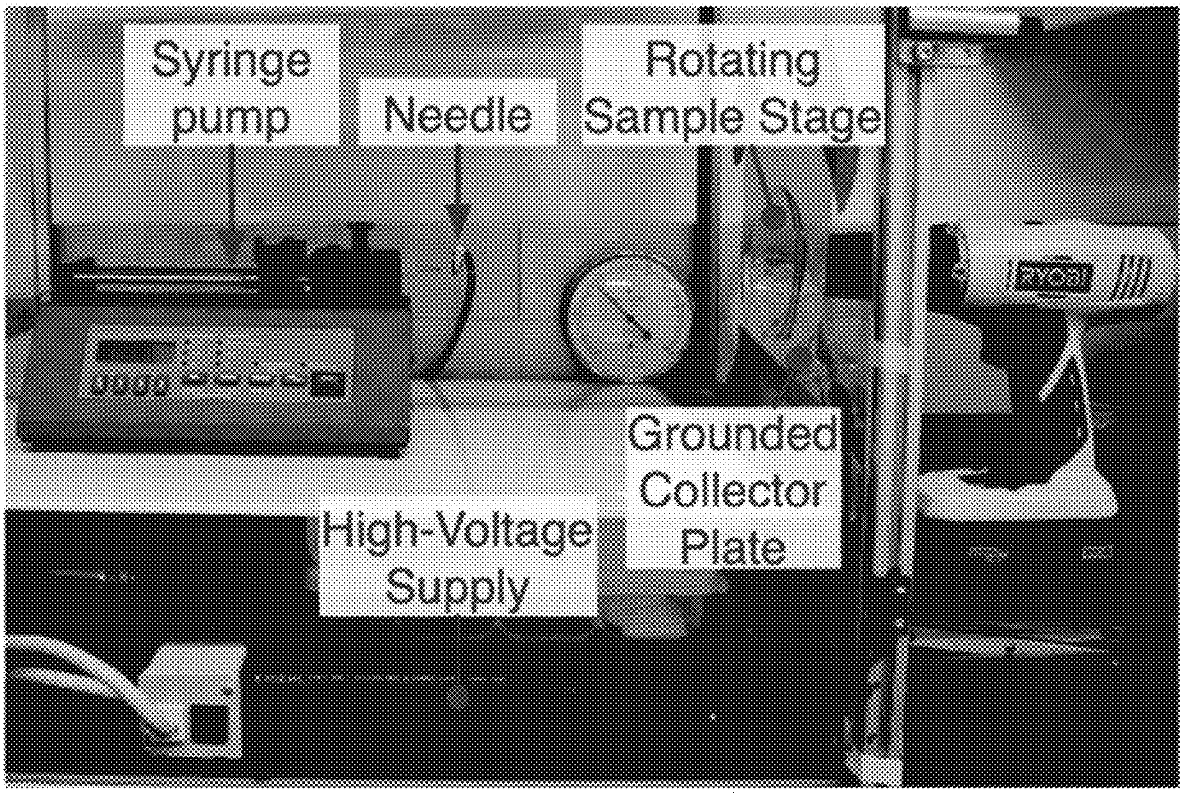
FIG. 12 illustrates a photo of a lab-built electrospinner setup, according to some embodiments of the present disclosure. A high-voltage supply creates an electric field between the needle and aluminum foil collector plate. A rotating sample stage in front of the collector plate increases nanowire uniformity.

Electrospinning Process: A custom built electrospinner (see FIG. 12) was used that included a syringe pump (New Era Pump Systems NE-1010), rotating collector plate (100 rpm), and high voltage supply (ESDEMC ES813-P30.1). The syringe was connected to an 18-gauge needle and the needle was connected to the positive output of the high-voltage supply with an alligator clip. The ink flow rate was 0.2 ml/hr, the distance between the needle tip and collector was 17 cm, and the electrospinning voltage was set to 15 kV. The electrospinning duration varied between 15 seconds to 120 seconds to achieve different wire densities. The substrates were microscope cover glasses (22 mm×22 mm×150 μm). Before electrospinning, substrates were cleaned with 15 minutes of sonication in acetone, then isopropanol, followed by 10 minutes of UV-ozone cleaning (Setcas, SC-UV-1).

Calcination and Silver Surface Activation: Immediately after electrospinning, each sample was placed on a hotplate at 300° C. for 30 seconds. Then, immediately before electroless deposition, each sample received a 10 second UV-ozone treatment (Setcas, SC-UV-1).

Electroless Copper Deposition: An electroless copper plating solution was synthesized following a recipe developed by Ben Krasnow (https://benkrasnow.blogspot.com/2018/09/make-plastic-printed-circuits-with.html). All chemicals were used as received and ensured the previous chemical was fully dissolved before adding the next chemical. First 300.0 mL of DI water was measured into a beaker with a stir bar and heated to 40° C. using a hotplate. Then, in order, 6.00 g of potassium sodium tartrate tetrahydrate (ACS reagent, 99%, Sigma-Aldrich), 1.50 g copper (II) sulfate pentahydrate (99.995%, Sigma-Aldrich), 1.20 g sodium hydroxide (ACS reagent, ≥97%, Sigma-Aldrich), 1.50 g sodium carbonate (ReagentPlus®, ≥99.5 Sigma-Aldrich), and 3 ml formaldehyde (ACS reagent, 37 wt. % in $H_2O$, containing 10-15% Methanol as stabilizer, Sigma-Aldrich) were added to the beaker. During plating, polyimide tape suspended the samples in the solution. A hotplate maintained the bath at 35° C. with no stirring. The deposition time was varied between 15 minutes and 120 minutes. After copper plating, the samples were submerged in two consecutive beakers of DI water to remove excess solution, then blow-dried using compressed nitrogen. Separate samples were used for each data point because resubmerging samples in the copper plating solution tended to cause wire delamination.

Figure 5:
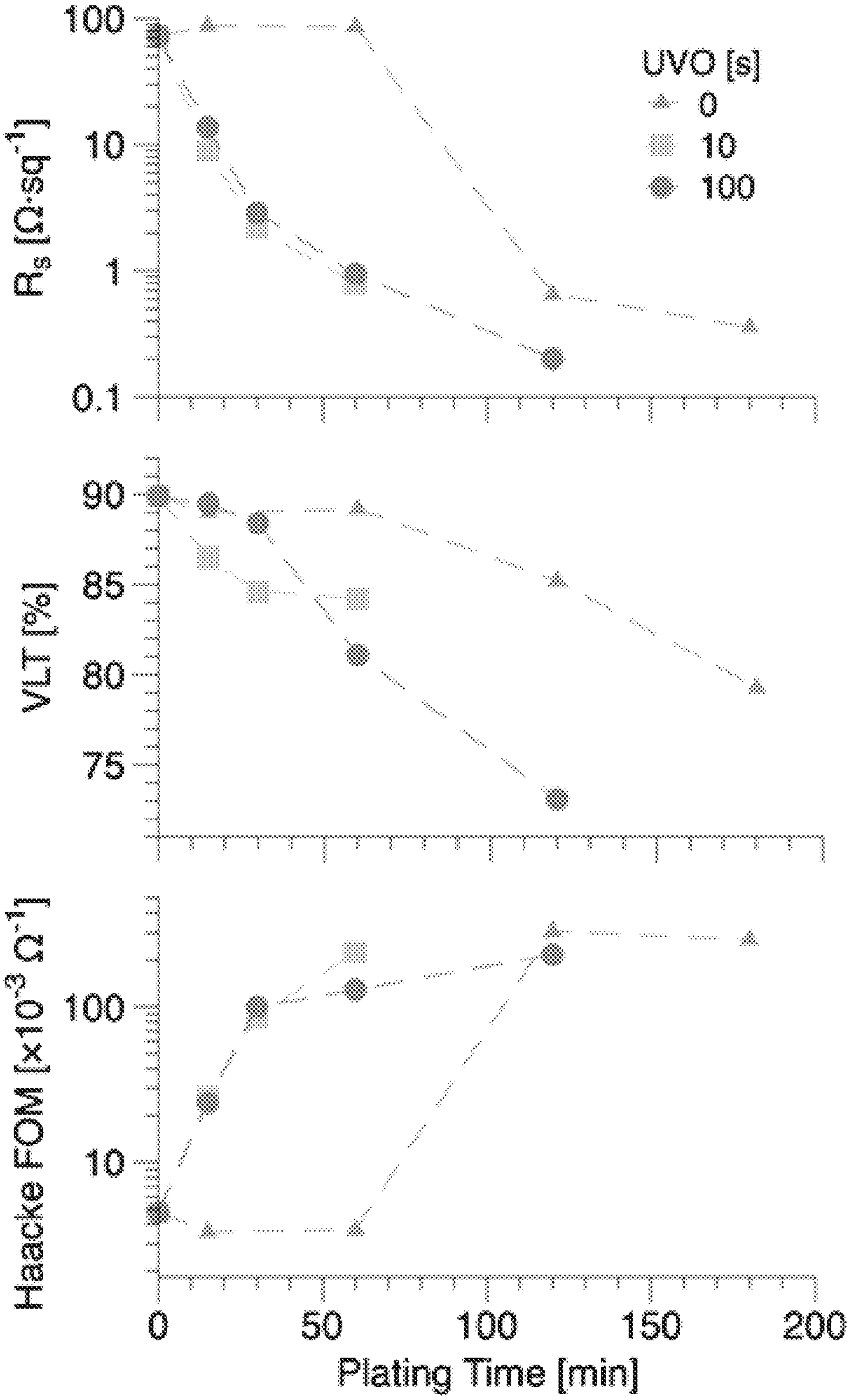
FIG. 5 illustrates the impact of different UV-ozone treatment times on the sheet resistance ($R_s$), visible light transmittance (VLT), and Figure of Merit (FOM). 10 seconds of UV-ozone treatment resulted in consistent plating and the highest FOM, according to some embodiments of the present disclosure.

UV-Ozone Surface Treatment: FIG. 5 shows the impact of different UV-ozone durations (0 seconds, 10 seconds, and 100 seconds) on the sheet resistance ($R_s$), visible light transmittance (VLT), and figure of merit (FOM) as plating time increases. The samples without surface treatment did not follow any consistent trends due to inconsistent plating. The 10 seconds and 100 s UV-ozone times increased the plating rate and resulted in uniform trends. We chose 10 seconds of UV-ozone treatment because it resulted in the highest FOM.

Characterization: Light transmittance was measured using a visible spectrophotometer (Thermo Scientific, GENESYS 40) over the wavelength range of 1100 nm to 325 nm in 1 nm increments. The spectrophotometer was blanked with air, so all transmittance values include the substrate's contribution. A custom Python script converted the transmittance spectra to Visible Light Transmittance (VLT). VLT provides a single transmittance value that weights each wavelength according to the human eye's sensitivity. The VLT value was always within 1% of the transmittance at 550 nm. A Varian Cary 5G UV-Vis-NIR Spectrophotometer with an integrating sphere measured the optical haze.

Figure 13:
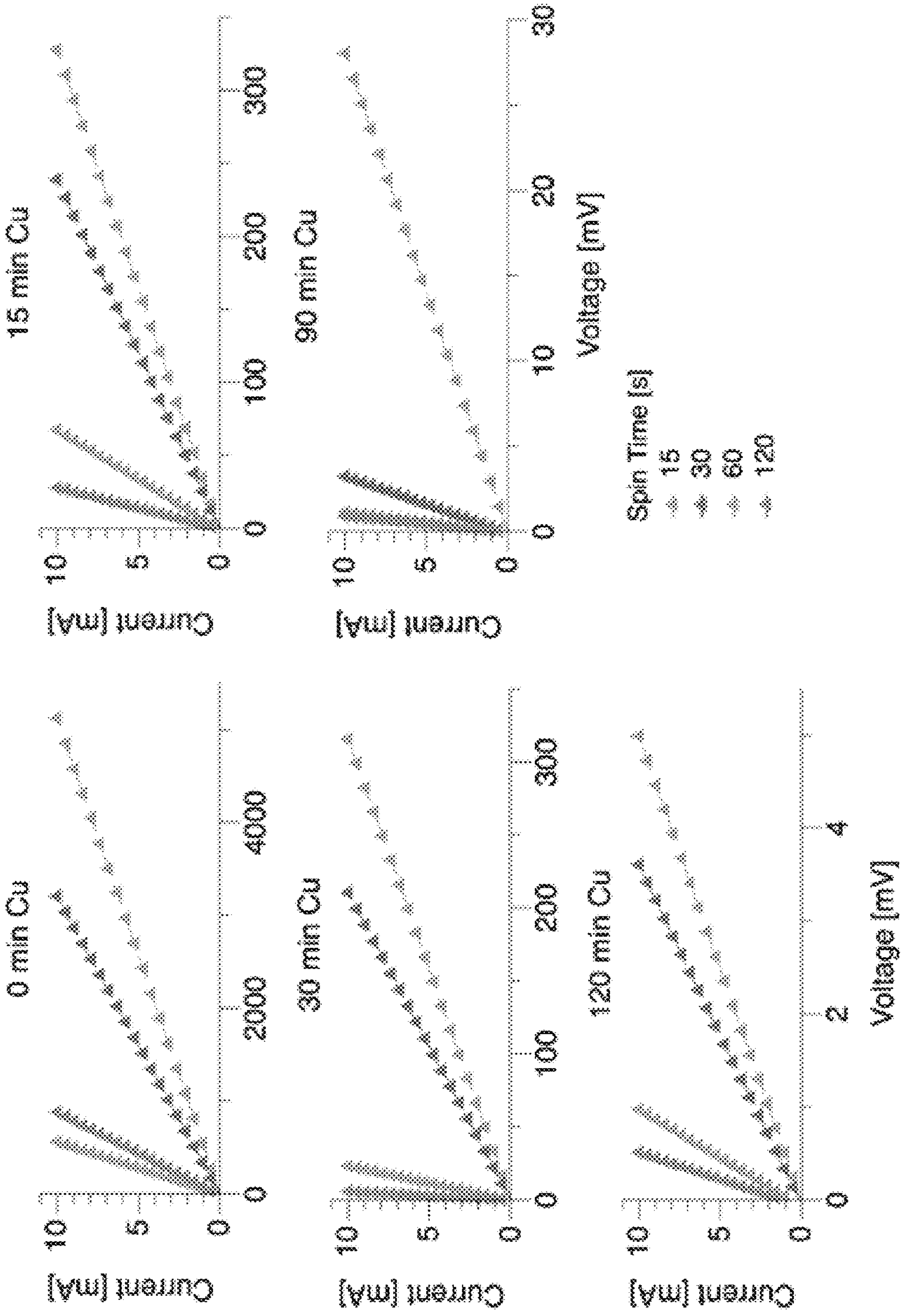
FIG. 13 illustrates IV curves for each sample, according to some embodiments of the present disclosure. The linear voltage and current relationship indicates that these electrodes have an ohmic behavior.

Sheet resistances were obtained by measuring the resistance between two pads separating a square area of TCE material. After fabricating the TCEs, silver probing pads were made along two opposing sides of the samples by airbrushing silver paint, then a 100° C. hotplate cured the silver for ~1 min. Excess wires were removed so that the pads encompassed an 18 mm×18 mm square area. A source measurement unit (Keysight, B2901A) and a 4-point probe station were used to collect current-voltage data over the range of 0 mA to 10 mA. Sheet resistances, $R_s$, were calculated using the inverse of the current-voltage slope. Each sample showed an ohmic current-voltage response (see FIG. 13).

Bending samples were delaminated using polypropylene tape (Duck® Brand HD Clear™, 66 μm thick). Copper tape contacts, separating an 18 mm×18 mm square area of the TCE material, were added on opposing sides of the sample (see FIG. 11). Alligator clips, connected to the copper contacts, served as connection points to apply bending and measure sheet resistance in situ. A Nordson Pro4L robot pushed and pulled the alligator clips to achieve a 2.5 mm compound bend. Calipers were used to measure the bending diameter at the red arcs indicated in Panel b of FIG. 10. An Agilent 34461A digital multimeter, connected to the alligator clips, continually monitored the sheet resistance throughout the bending cycles.

Morphology images were collected with a scanning electron microscope (SEM, Amray 3300 with SEMView 8000 electronics). A 7 kV accelerating voltage was used and coated the samples with gold prior to imaging. A laser microscope (Keyence VK-X260K) collected the 3D profile measurements.

Method Examples

Example 1. A method comprising: depositing a liquid strand comprising an ink onto a substrate; transforming the liquid strand to a precursor strand; converting at least a portion of the precursor strand to a nanowire comprising a first metal; and coating the nanowire with a second metal to form a core-shell nanowire comprising a core and a shell, wherein: at least a portion of the transforming occurs during the depositing, and the core comprises the nanowire and the shell comprises the second metal.

Example 2. The method of Example 1, wherein the first metal and the second metal are the same.

Example 3. The method of either Example 1 or Example 2, wherein the substrate comprises at least one of a metal oxide, a transparent conducting oxide (TCO), a glass, or a plastic.

Example 4. The method of any one of Examples 1-3, wherein the TCO comprises at least one of indium tin oxide (ITO), zinc oxide (ZnO), tin oxide, aluminum doped zinc oxide (AZO), indium oxide, cadmium oxide, or indium doped zinc oxide.

Example 5. The method of any one of Examples 1-4, wherein the metal oxide comprises at least one of tin oxide, nickel oxide, alumina, titania, or silicon oxide.

Example 6. The method of any one of Examples 1-5, wherein the plastic comprises at least one of a polyolefin, a polyamine, a polyamide, or polyethylene terephthalate.

Example 7. The method of any one of Examples 1-6, wherein the first metal comprises at least one of silver, copper, gold, aluminum, nickel, platinum, palladium, zinc, or iron.

Example 8. The method of any one of Examples 1-7, wherein the second metal comprises at least one of copper, silver, gold, aluminum, nickel, platinum, palladium, zinc, or iron.

Example 9. The method of any one of Examples 1-8, wherein the first metal is different than the second metal.

Example 10. The method of any one of Examples 1-9, wherein the ink comprises a metal precursor and a polymer.

Example 11. The method of any one of Examples 1-10, wherein the metal precursor comprises a salt.

Example 12. The method of any one of Examples 1-11, wherein the salt comprises a metal cation and an anion.

Example 13. The method of any one of Examples 1-12, wherein the metal cation comprises at least one of silver, copper, gold, aluminum, nickel, platinum, palladium, zinc, or iron.

Example 14. The method of any one of Examples 1-13, wherein the anion comprises at least one of a carboxylate, a halide, carbonate, nitrate, citrate, oxalate, hexafluorophosphate, sulfate, or thiosulfate.

Example 15. The method of any one of Examples 1-14, wherein the carboxylate comprises at least one of formate, acetate, propionate, buryate, or neodecanoate.

Example 16. The method of any one of Examples 1-15, wherein the halide comprises at least one of fluoride, chloride, bromide, or iodide.

Example 17. The method of any one of Examples 1-16, wherein the polymer comprises at least one of a polyester, poly(ethylene oxide) (PEO), polyvinylpyrrolidone (PVP), polyvinyl butyral, poly(vinyl acetate) poly(vinylidene fluoride), polystyrene, and polyacrylonitrile.

Example 18. The method of any one of Examples 1-17, wherein the polyester comprises polyethylene terephthalate (PET).

Example 19. The method of any one of Examples 1-18, wherein the ink is prepared by: preparing a metal ink comprising the metal precursor; preparing a solution comprising the polymer; and combining the metal ink and the solution to form the ink.

Example 20. The method of any one of Examples 1-19, wherein the ink is prepared by combining in a single mixture, a metal precursor, a polymer, and a solvent.

Example 21. The method of any one of Examples 1-20, wherein the depositing comprises electrospinning.

Example 22. The method of any one of Examples 1-21, wherein the converting results in at least a portion of the first metal transferring to a surface of the precursor strand.

Example 23. The method of any one of Examples 1-22, wherein the converting comprises exposing a surface of the precursor strand to at least one of ultraviolet light, ozone, or plasma.

Example 24. The method of any one of Examples 1-23, wherein the converting is performed for a period of time between 1 second and 10 minutes or between 1 second and 1 minute.

Example 25. The method of any one of Examples 1-24, wherein the converting comprises ultraviolet light and ozone.

Example 26. The method of any one of Examples 1-25, wherein the converting comprises introducing a gas comprising oxygen or oxygen and nitrogen.

Example 27. The method of any one of Examples 1-26, wherein the ultraviolet light comprises a wavelength between 150 nm and 270 nm.

Example 28. The method of any one of Examples 1-27, wherein the ultraviolet light is provided at an intensity between 20 $mW/cm^2$ and 50 $mW/cm^2$.

Example 29. The method of any one of Examples 1-28, wherein the ultraviolet light is provided by a light source positioned between 5 mm and 300 mm from the precursor strand.

Example 30. The method of any one of Examples 1-29, wherein the converting comprises exposing a surface of the precursor strand to a plasma and a gas comprising argon and oxygen.

Example 31. The method of any one of Examples 1-30, wherein the gas is provided at a flow rate between greater than 0 $cm^3$/min and 1000 $cm^3$/min.

Example 32. The method of any one of Examples 1-31, wherein the converting further comprises utilizing a radio frequency (RF) power between 10 W and 600 W.

Example 33. The method of any one of Examples 1-32, wherein the converting is completed under vacuum between about 0 Torr and about 1 Torr.

Example 34. The method of any one of Examples 1-33, wherein the converting comprises exposing a surface of the precursor strand to at least one of a liquid or a gas.

Example 35. The method of any one of Examples 1-34, wherein: the precursor strand is exposed to hydrogen gas, and the hydrogen gas reduces the polymer and the silver salt.

Example 36. The method of any one of Examples 1-35, wherein: the precursor strand is exposed to an acid, and the acid at least one of depolymerizes or decomposes the polymer.

Example 37. The method of any one of Examples 1-36, wherein the acid comprises an inorganic acid.

Example 38. The method of any one of Examples 1-37, wherein the inorganic acid comprises at least one of sulfuric acid, phosphoric acid, nitric acid, hydrochloric acid, or acetic acid.

Example 39. The method of any one of Examples 1-38, wherein the converting further comprises heating at least one of the precursor strand or the nanowire.

Example 40. The method of any one of Examples 1-39, wherein the heating comprises heating the substrate and the precursor strand to a temperature between 50° C. and 500° C. or between 200° C. and 400° C.

Example 41. The method of any one of Examples 1-40, wherein the heating comprises maintaining the temperature for a period of time between one second and 10 minutes or between one second and 1 minute.

Example 42. The method of any one of Examples 1-41, wherein the heating is achieved using at least one of conductive heat transfer, radiant heat transfer, or convective heat transfer.

Example 43. The method of any one of Examples 1-42, wherein at least one of conductive heat transfer or radiant heat transfer is provided using a hot surface.

Example 44. The method of any one of Examples 1-43 wherein the heating is achieved at atmospheric pressure in air or an inert gas.

Example 45. The method of any one of Examples 1-44, wherein the inert gas comprises at least one of argon, xenon, or nitrogen.

Example 46. The method of any one of Examples 1-45, wherein the coating comprises electroless plating of the second metal onto the nanowire.

Example 47. The method of any one of Examples 1-46, wherein the electroless plating is performed by immersing the nanowire and the substrate into a solution.

Example 48. The method of any one of Examples 1-47, wherein the solution is an aqueous solution.

Example 49. The method of any one of Examples 1-48, wherein, during the electroless plating, the aqueous solution is maintained at a temperature between 22° C. and 100° C. or between 30° ° C. and 40° C.

Example 50. The method of any one of Examples 1-49, wherein, the aqueous solution is maintained at the temperature for a period of time between 1 minute and 4 hours or between 5 minutes and 3 hours.

Example 51. The method of any one of Examples 1-50, wherein the core-shell nanowire has an average diameter, Dnw, between 1 nm and 3 μm, or between 10 nm and 1 μm, or between 200 nm and 500 nm.

Example 52. The method of any one of Examples 1-51, wherein the core has an average diameter, $D_c$, between 1 nm and 1 μm, or between 10 nm and 500 nm, or between 20 nm and 250 nm.

Example 53. The method of any one of Examples 1-52, wherein the shell has an average thickness, t, between 1 nm and 3 μm, or between 10 nm and 1 μm, or between 200 nm and 500 nm.

Example 54. The method of any one of Examples 1-53, wherein: core-shell nanowire is one of a plurality of core-shell nanowires and the plurality of core-shell nanowires form a network of physically interconnected core-shell nanowires on the substrate, and the core-shell nanowires are oriented substantially parallel to the substrate.

Example 55. The method of any one of Examples 1-54, wherein the network forms a device comprising the core-shell nanowires and the substrate.

Example 56. The method of any one of Examples 1-55, wherein the network has a nanowire areal coverage on the substrate between 0.1% and 50%.

Example 57. The method of any one of Examples 1-56, wherein the core-shell nanowires are randomly distributed in the network.

Example 58. The method of any one of Examples 1-57, wherein: the core-shell nanowires of the network are distributed in a grid; the grid comprises a first group of core-shell nanowires oriented substantially parallel to neighboring core-shell nanowires of the first group; the grid comprises a second group of core-shell nanowires oriented substantially parallel to neighboring core-shell nanowires of the second group; and the core-shell nanowires of the first group are oriented substantially perpendicular to the core-shell nanowires of the second group.

Example 59. The method of any one of Examples 1-58, wherein neighboring core-shell nanowires of the first group are separated by a first distance between 500 nm and 100 μm or between 1 μm and 50 μm.

Example 60. The method of any one of Examples 1-59, wherein neighboring core-shell nanowires of the second group are separated by a second distance between 500 nm and 100 μm or between 1 μm and 50 μm.

Example 61. The method of any one of Examples 1-60, wherein the device is characterized by a Haacke Figure of Merit between $1\times10^{-3}\cdot\Omega^{-1}$ and $700\times10^{-3}\cdot\Omega^{-1}$.

Example 62. The method of any one of Examples 1-61, wherein the device is characterized by transmitting visible light with a transmittance between 0% and 95%.

Example 63. The method of any one of Examples 1-62, wherein the device is characterized by a sheet resistance between 0.1 Ω/sq and 500 Ω/sq.

Example 64. The method of any one of Examples 1-63, wherein the device is characterized by a haze between 1% and 15%.

Device Examples

Example 65. A device comprising: a network of physically interconnected core-shell nanowires deposited on a substrate, wherein: each nanowire comprises a core comprising a first metal and a shell comprising a second metal positioned around the core, and each core-shell nanowire has a diameter, Dnw, between 1 nm and 1 μm, and the substrate comprises at least one of a metal oxide, a transparent conducting oxide (TCO), a glass, or a plastic.

Example 66. The device of Example 65, wherein the network has a nanowire areal coverage on the substrate between 0.1% and 50%.

Example 67. The device of either Example 65 or Example 66, wherein the device is characterized by a Haacke Figure of Merit between $1\times10^{-3}\cdot\Omega^{-1}$ and $700\times10^{-3}\cdot\Omega^{-1}$.

Example 68. The device of any one of Examples 65-67, wherein the device is characterized by transmitting visible light with a transmittance between 0% and 95%.

Example 69. The device of any one of Examples 65-68, wherein the device is further characterized by a sheet resistance between 0.1 Ω/sq and 500 Ω/sq.

Example 70. The device of any one of Examples 65-69, wherein the device is further characterized by a haze between 1% and 15%.

Example 71. The device of any one of Examples 65-70, wherein core-shell nanowires are randomly distributed in the network.

Example 72. The device of any one of Examples 65-71, wherein: the core-shell nanowires of the network are distributed in a grid; the grid comprises a first group of core-shell nanowires oriented substantially parallel to neighboring core-shell nanowires of the first group; the grid comprises a second group of core-shell nanowires oriented substantially parallel to neighboring core-shell nanowires of the second group; and the core-shell nanowires of the first group are oriented substantially perpendicular to the core-shell nanowires of the second group.

Example 73. The device of any one of Examples 1-72, wherein neighboring core-shell nanowires of the first group are separated by a first distance between 500 nm and 100 μm or between 1 μm and 50 μm.

Example 74. The device of any one of Examples 1-72, wherein neighboring core-shell nanowires of the second group are separated by a second distance between 500 nm and 100 μm or between 1 μm and 50 μm.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method comprising:

depositing onto a substrate a liquid strand comprising an ink comprising a metal precursor and a polymer, resulting in a precursor strand;

converting the precursor strand to a nanowire core comprising a first metal derived from the metal precursor; and coating the nanowire core with a shell comprising a second metal, forming a core-shell nanowire, wherein:

the depositing comprises electrospinning, during the depositing, the liquid strand is transformed to the precursor strand comprising a substantially liquid free solid comprising the metal precursor and the polymer, the converting comprises exposing the precursor strand to ultraviolet light and ozone; and during the converting, the polymer decomposes, the first metal is transferred to a surface of the precursor strand, or both.

2. The method of claim 1, wherein the first metal and the second metal are the same.

3. The method of claim 1, wherein the substrate comprises at least one of a metal oxide, a transparent conducting oxide (TCO), a glass, or a plastic.

4. The method of claim 1, wherein the first metal comprises at least one of silver, copper, gold, aluminum, nickel, platinum, palladium, zinc, or iron.

5. The method of claim 4, wherein the second metal comprises at least one of copper, silver, gold, aluminum, nickel, platinum, palladium, zinc, or iron.

6. The method of claim 5, wherein the first metal is different than the second metal.

7. The method of claim 6, wherein the first metal comprises silver and the second metal comprises copper.

8. The method of claim 1, wherein the ink is prepared by:

preparing a metal ink comprising the metal precursor;

preparing a solution comprising the polymer; and combining the metal ink and the solution to form the ink.

9. The method of claim 8, wherein the converting further comprises exposing a surface of the precursor strand to at least one of a liquid or a gas.

10. The method of claim 9, wherein the precursor strand is exposed to hydrogen gas.

11. The method of claim 9, wherein:

the precursor strand is exposed to an acid, and the acid depolymerizes the polymer, decomposes the polymer, or both.

12. The method of claim 8, wherein the metal ink comprises a metal acetate, ammonium hydroxide, and formic acid.

13. The method of claim 1, wherein the converting results in at least a portion of the first metal transferring to a surface of the precursor strand.

14. The method of claim 1, wherein the converting further comprises exposing a surface of the precursor strand to plasma.

15. The method of claim 14, wherein the converting comprises exposing a surface of the precursor strand to plasma and a gas comprising argon and oxygen.

16. The method of claim 1, wherein the converting further comprises heating at least one of the precursor strand or the nanowire core.

17. The method of claim 16, wherein the heating comprises heating the substrate and the precursor strand to a temperature between 200° C. and 400° C.

18. The method of claim 1, wherein the coating comprises electroless plating of the second metal onto the nanowire core.

19. The method of claim 1, wherein the nanowire core has a substantially circular cross-sectional shape.

20. The method of claim 19, wherein the nanowire core has a diameter between 10 nm and 500 nm.

* * * * *